United States Patent
Achim et al.

(10) Patent No.: US 10,375,572 B2
(45) Date of Patent: Aug. 6, 2019

(54) USER INTERFACE FOR SECURITY PROTECTION AND REMOTE MANAGEMENT OF NETWORK ENDPOINTS

(71) Applicant: Bitdefender IPR Management Ltd., Nicosia (CY)

(72) Inventors: Alexandru I. Achim, Targu Jiu (RO); Mirela L. Padina, Bucharest (RO); Monica M. Miron, Piatra Nearnt (RO); Bogdan C. Cebere, Bucharest (RO); Cosmin C. Stan, Slatina (RO); Catalina Albisteanu, Bacau (RO); Dan Berte, Cluj-Napoca (RO); Bogdan Dumitrache, Bucharest (RO); Daniel A. Mircescu, Bucharest (RO); Alex Novac, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 303 days.

(21) Appl. No.: 14/966,315

(22) Filed: Dec. 11, 2015

(65) Prior Publication Data

US 2016/0173447 A1    Jun. 16, 2016

Related U.S. Application Data

(60) Provisional application No. 62/217,310, filed on Sep. 11, 2015, provisional application No. 62/180,390, (Continued)

(51) Int. Cl.
*H04L 9/00*        (2006.01)
*H04W 12/08*      (2009.01)
(Continued)

(52) U.S. Cl.
CPC ............ *H04W 12/08* (2013.01); *G06F 9/542* (2013.01); *H04L 12/4633* (2013.01);
(Continued)

(58) Field of Classification Search
CPC ...................................................... H04W 12/08
See application file for complete search history.

(56) References Cited

U.S. PATENT DOCUMENTS 7,809,811 B1    10/2010    Rao
8,307,444 B1    11/2012    Mayer et al.
(Continued)

FOREIGN PATENT DOCUMENTS

EP    2575319 A1    4/2013
JP    2008-46934 A    2/2008
(Continued)

OTHER PUBLICATIONS

Poeter, "Bitdefender unveils IoT Security Appliance," http://www.pcmag.com/article2/0,2817,2472670,00.asp, PCMagazine, New York, NY, USA, Nov. 2014.
(Continued)

*Primary Examiner* — Alexander Lagor
*Assistant Examiner* — Syed M Ahsan
(74) *Attorney, Agent, or Firm* — Law Office of Andrei D Popovici, PC

(57) ABSTRACT

In some embodiments, a network regulator device protects a local network of client systems (e.g. Internet-of-things devices such as smartphones, home appliances, wearables, etc.) against computer security threats. Various aspects of the operation of the network regulator may be managed remotely via a graphical user interface (GUI) executing on an administration device, such as a mobile phone. The GUI is further configured to display a security notification to a user of the administration device, the security notification
(Continued)

indicating the occurrence of a security event caused by an action of a protected client system.

22 Claims, 18 Drawing Sheets

Related U.S. Application Data filed on Jun. 16, 2015, provisional application No. 62/090,547, filed on Dec. 11, 2014.

(51) Int. Cl.
| | |
|---|---|
| *H04L 12/24* | (2006.01) |
| *H04L 29/06* | (2006.01) |
| *G06F 9/54* | (2006.01) |
| *H04L 29/08* | (2006.01) |
| *H04L 12/26* | (2006.01) |
| *H04L 12/46* | (2006.01) |
| *H04W 76/32* | (2018.01) |
| *H04W 76/12* | (2018.01) |
| *H04L 12/28* | (2006.01) |
| *H04L 29/12* | (2006.01) |
| *H04W 88/12* | (2009.01) |
| *H04W 88/16* | (2009.01) |
| *H04W 4/70* | (2018.01) |

(52) U.S. Cl.
CPC .......... *H04L 41/0816* (2013.01); *H04L 41/22* (2013.01); *H04L 43/0876* (2013.01); *H04L 63/02* (2013.01); *H04L 63/029* (2013.01); *H04L 63/0272* (2013.01); *H04L 63/101* (2013.01); *H04L 63/123* (2013.01); *H04L 63/14* (2013.01); *H04L 63/1408* (2013.01); *H04L 63/1416* (2013.01); *H04L 63/1425* (2013.01); *H04L 63/20* (2013.01); *H04L 67/02* (2013.01); *H04L 67/12* (2013.01); *H04W 76/12* (2018.02); *H04W 76/32* (2018.02); *H04L 12/2834* (2013.01); *H04L 61/2015* (2013.01); *H04L 61/2061* (2013.01); *H04L 63/105* (2013.01); *H04W 4/70* (2018.02); *H04W 88/12* (2013.01); *H04W 88/16* (2013.01)

(56) References Cited

U.S. PATENT DOCUMENTS

| | | | |
|---|---|---|---|
| 8,370,918 | B1 | 2/2013 | Doukhvalov et al. |
| 8,539,567 | B1 | 9/2013 | Logue et al. |
| 8,892,766 | B1 | 11/2014 | Wei et al. |
| 8,996,659 | B2 | 3/2015 | Werth et al. |
| 9,026,648 | B1 | 5/2015 | Slavin |
| 9,077,736 | B2 | 7/2015 | Werth et al. |
| 9,936,388 | B2 | 4/2018 | Stan et al. |
| 10,045,217 | B2 | 8/2018 | Stan et al. |
| 10,080,138 | B2 | 9/2018 | Stan et al. |
| 2001/0030664 | A1* | 10/2001 | Shulman ................ G06Q 30/02 715/835 |
| 2002/0138443 | A1 | 9/2002 | Schran et al. |
| 2003/0002496 | A1 | 1/2003 | Beier |
| 2003/0051172 | A1 | 3/2003 | Lordemann et al. |
| 2004/0153644 | A1* | 8/2004 | McCorkendale ....... G06F 21/33 713/156 |
| 2005/0208947 | A1 | 9/2005 | Bahl |
| 2005/0232146 | A1 | 10/2005 | Lee et al. |
| 2005/0257065 | A1 | 11/2005 | Morris et al. |
| 2007/0019236 | A1 | 1/2007 | Sando |
| 2007/0021113 | A1 | 1/2007 | Hamasaki et al. |
| 2008/0172476 | A1* | 7/2008 | Daniel ................ H04L 41/0809 709/220 |
| 2008/0215711 | A1 | 9/2008 | Shitrit |
| 2009/0257425 | A1 | 10/2009 | Sastry et al. |
| 2010/0077064 | A1* | 3/2010 | Viger .................. H04L 12/4633 709/221 |
| 2011/0122774 | A1 | 5/2011 | Hassan et al. |
| 2011/0125898 | A1 | 5/2011 | Hassan et al. |
| 2011/0125925 | A1 | 5/2011 | Bouthemy et al. |
| 2011/0138310 | A1 | 6/2011 | Gomez et al. |
| 2011/0167348 | A1 | 7/2011 | Silva et al. |
| 2011/0252153 | A1 | 10/2011 | Vlodavsky |
| 2011/0277001 | A1 | 11/2011 | Kaluskar et al. |
| 2012/0130513 | A1 | 5/2012 | Hao et al. |
| 2012/0151058 | A1* | 6/2012 | Lee ..................... H04L 12/2834 709/225 |
| 2012/0167160 | A1 | 6/2012 | Carney et al. |
| 2013/0152187 | A1 | 6/2013 | Strebe et al. |
| 2014/0143854 | A1 | 5/2014 | Lopez et al. |
| 2014/0259147 | A1* | 9/2014 | L'Heureux ............. H04L 63/02 726/14 |
| 2016/0080425 | A1 | 3/2016 | Cianfrocca |
| 2016/0149948 | A1* | 5/2016 | Loomis ............... H04L 63/1441 726/23 |
| 2016/0295410 | A1* | 10/2016 | Gupta ................... H04W 76/18 |

FOREIGN PATENT DOCUMENTS

| | | | | |
|---|---|---|---|---|
| WO | | 2010019624 A1 | 2/2010 | |
| WO | WO 2010019624 A1 * | | 2/2010 | ........... G08B 25/008 |

OTHER PUBLICATIONS

Rashid, "Black Hat: Researchers take over Linksys router with simple JavaScript," http://www.scmagazine.com/black-hat-researchers-take-over-linksys-router-with-simple-javascript/printarticle/252521/, SC Magazine, New York, NY, USA, Jul. 2012.

Reese, "Reversing Rorpian-DHCP Hijacking Malware," http://resources.infosecinstitute.com/reversing-rorpian/, Riverse Engineering, InfoSec Institute, Elmwood Park, IL, USA, Dec. 2011.

Mcmillan, "Web page can take over your router," http://www.infoworld.com/article/2650002/security/web-page-can-take-over-your-router.html, InfoWorld, San Francisco, CA, USA, Apr. 2008.

Mcmillan, "Flash Attack Could Take Over Your Router," http://www.pcworld.com/article/141399/article.html, PC World, San Francisco, CA, Jan. 2008.

Goodin, Most home routers 'vulnerable to remote take-over', http://www.theregister.co.uk/2008/01/15/home_router_insecurity/, The Register, London, UK, Jan. 2008.

European Patent Office, International Search Report and Written Opinion dated Apr. 15, 2016 for PCT International Application No. PCT/RO2015/050010, international filing date Dec. 11, 2015, priority date Dec. 11, 2014.

European Patent Office, International Search Report and Written Opinion dated Apr. 15, 2016 for PCT International Application No. PCT/RO2015/050012, international filing date Dec. 11, 2015, priority date Dec. 11, 2014.

European Patent Office, International Search Report and Written Opinion dated Apr. 15, 2016 for PCT International Application No. PCT/RO2015/050013, international filing date Dec. 11, 2015, priority date Dec. 11, 2014.

Yuill et al., "Using Deception to Hide Things from Hackers: Processes, Principles, and Techniques," Information Warfare, v. 5 No. 3, Naval Postgraduate School (U.S.), Monterey, CA, United States, 2006; the year of publication is sufficiently earlier than the effective U.S. filing date and any foreign priority date so that the particular month of publication is not in issue.

European Patent Office, International Search Report and Written Opinion dated Apr. 15, 2016 for PCT International Application No. PCT/RO2015/050011, international filing date Dec. 11, 2015, priority date Dec. 11, 2014.

USPTO, Office Action dated May 17, 2017 for U.S. Appl. No. 14/966,344, filed Dec. 11, 2015.

USPTO, Office Action dated Dec. 15, 2017 for U.S. Appl. No. 14/966,344, filed Dec. 11, 2015.

(56) References Cited

OTHER PUBLICATIONS

USPTO, Office Action dated Dec. 6, 2016 for U.S. Appl. No. 14/966,401, filed Dec. 11, 2015.
USPTO, Office Action dated Apr. 17, 2017 for U.S. Appl. No. 14/966,401, filed Dec. 11, 2015.
USPTO, Office Action dated Oct. 31, 2017 for U.S. Appl. No. 14/966,401, filed Dec. 11, 2015.
USPTO, Office Action dated Jun. 13, 2018 for U.S. Appl. No. 15/940,284, filed Mar. 29, 2018.
USPTO, Office Action dated Oct. 16, 2017 for U.S. Appl. No. 14/966,430, filed Dec. 11, 2015.
USPTO, Office Action dated Jun. 7, 2017 for U.S. Appl. No. 14/966,430, filed Dec. 11, 2015.
Mircescu, U.S. Appl. No. 14/966,430, filed Dec. 11, 2015.
Stan, U.S. Appl. No. 16/133,238, filed Sep. 17, 2018.
Japan Patent Office, Office Action dated Mar. 18, 2019 for Japanese Patent Application No. 2017-531196, International filing date Dec. 11, 2015.

* cited by examiner

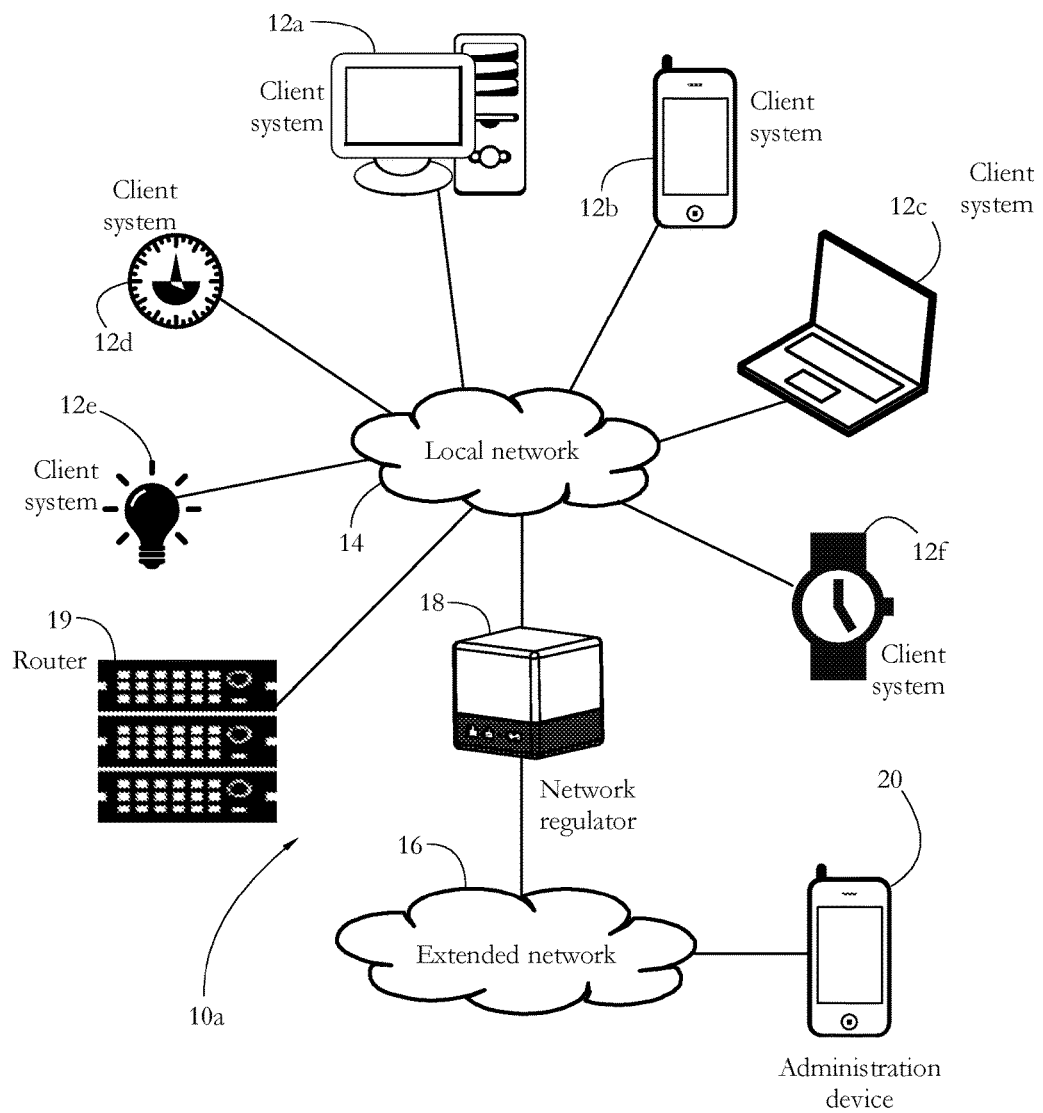
FIG. 1-A

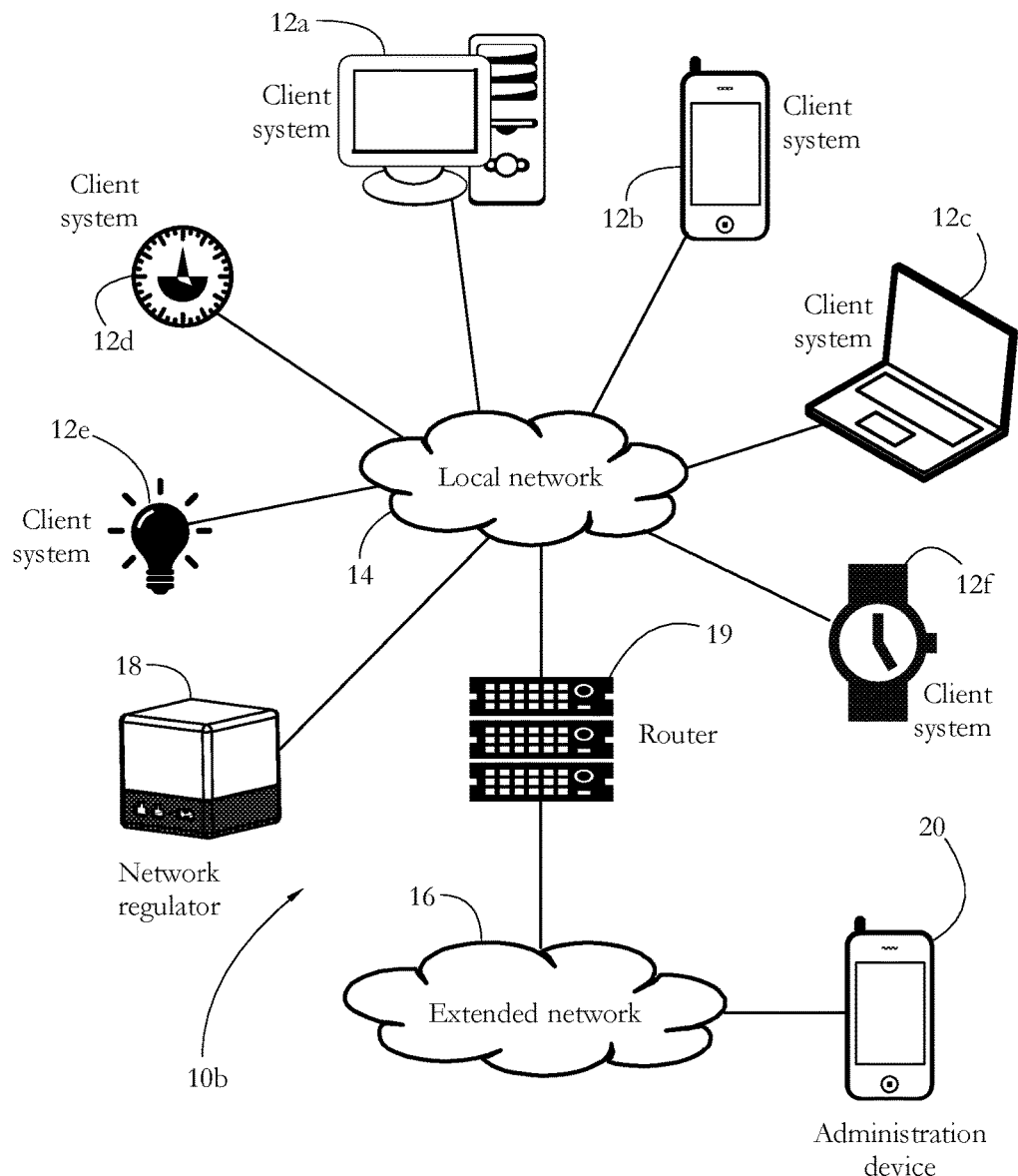
FIG. 1-B

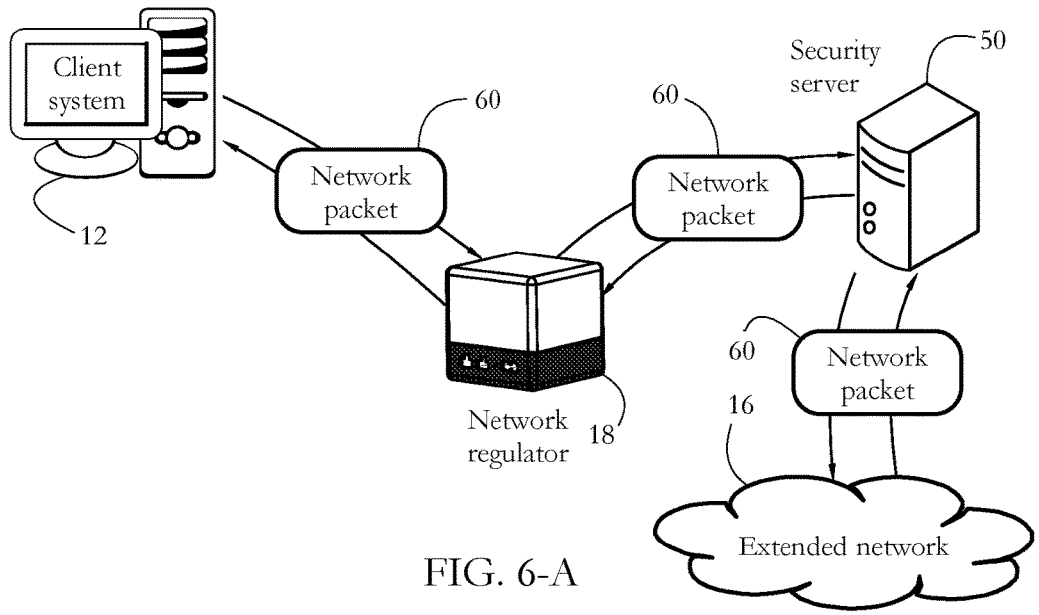
FIG. 6-A
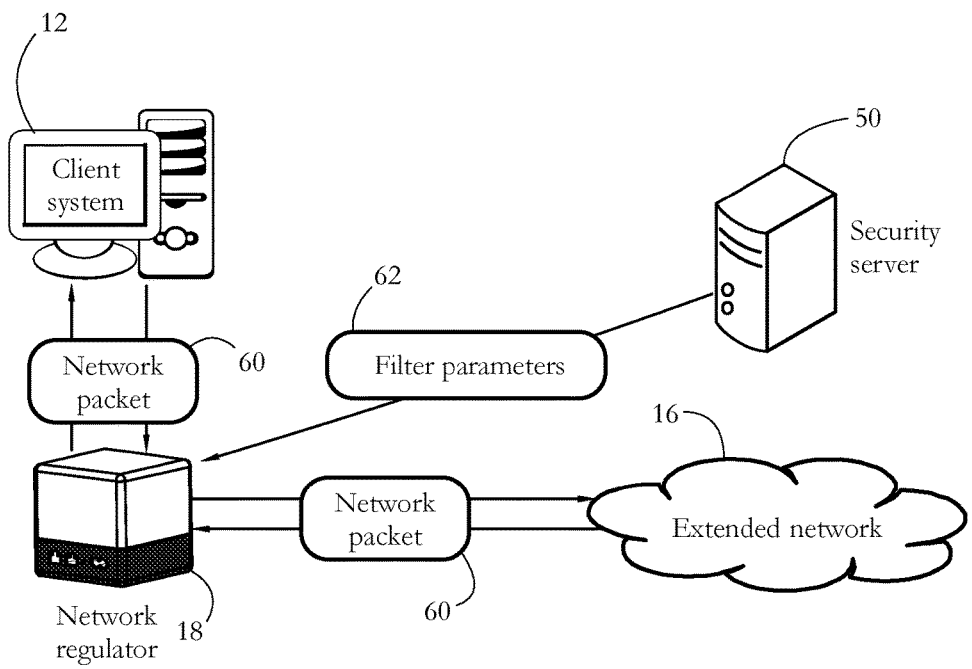
FIG. 6-B

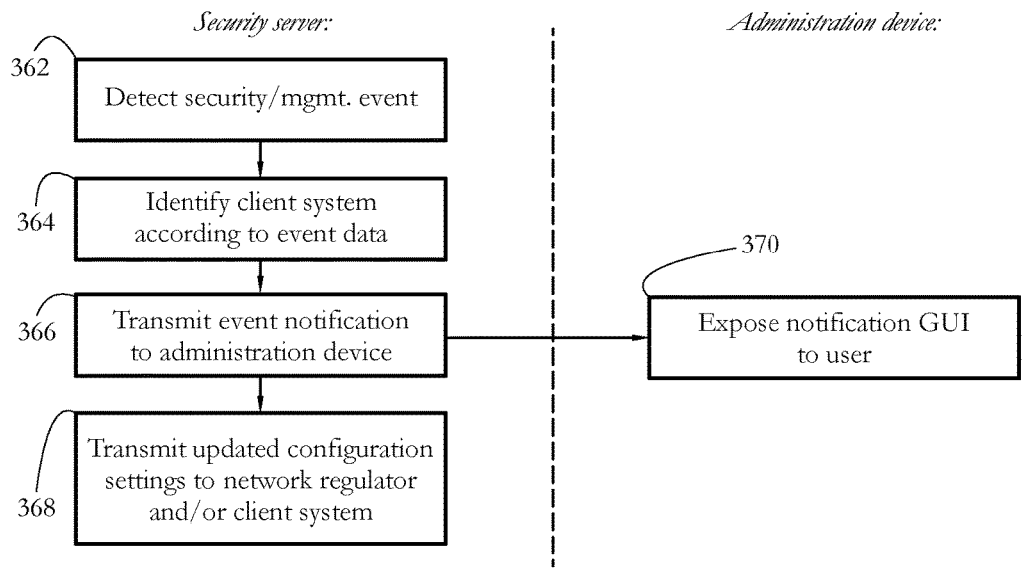
FIG. 12
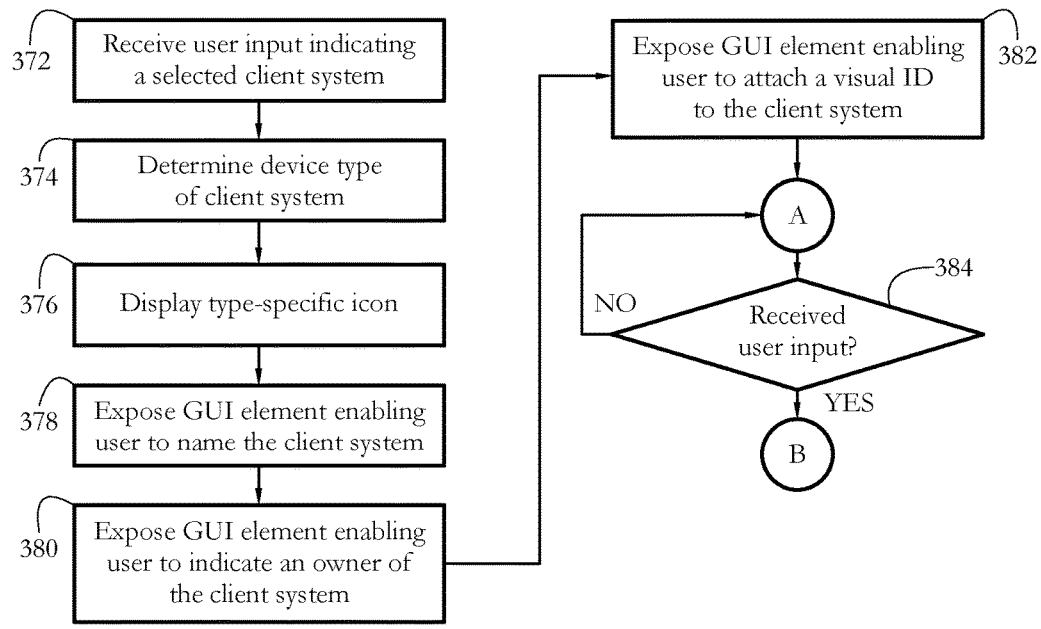
FIG. 13-A

FIG. 13-B

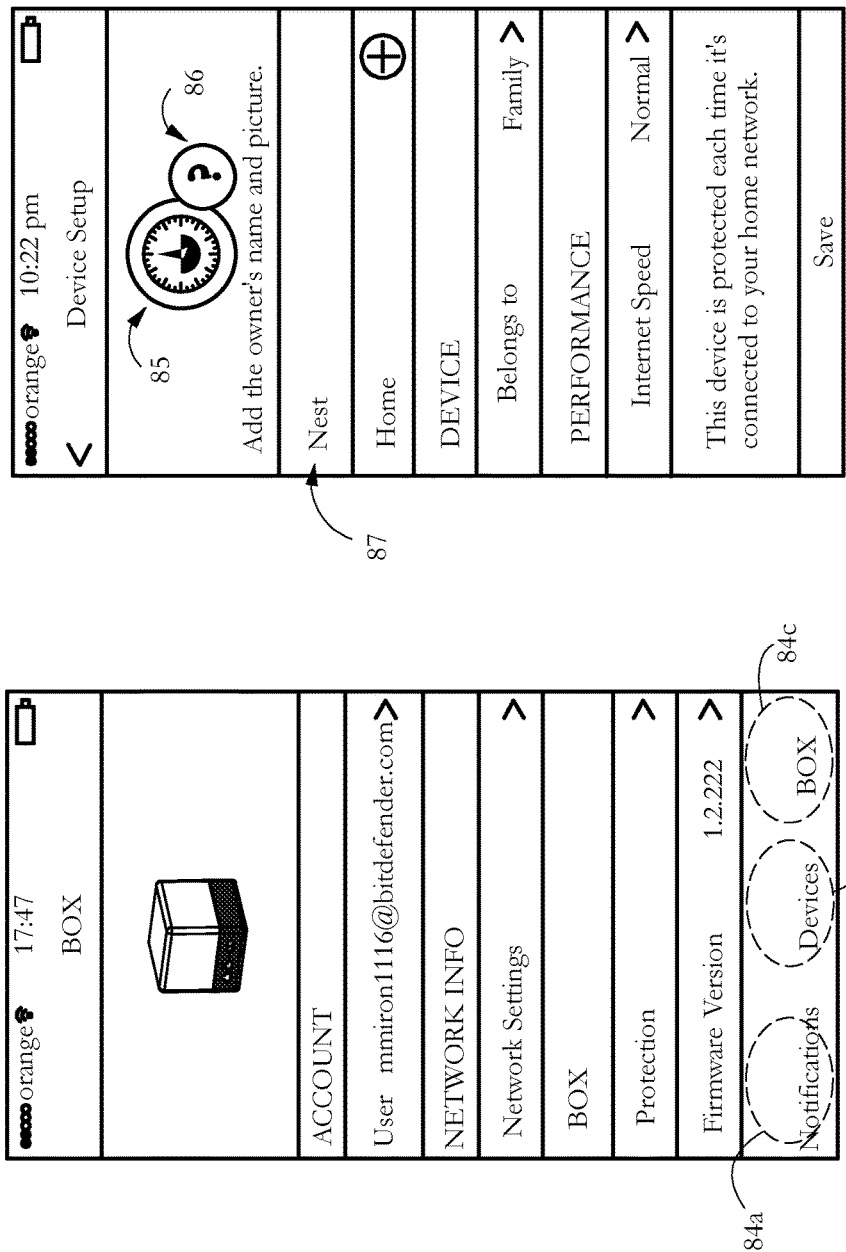

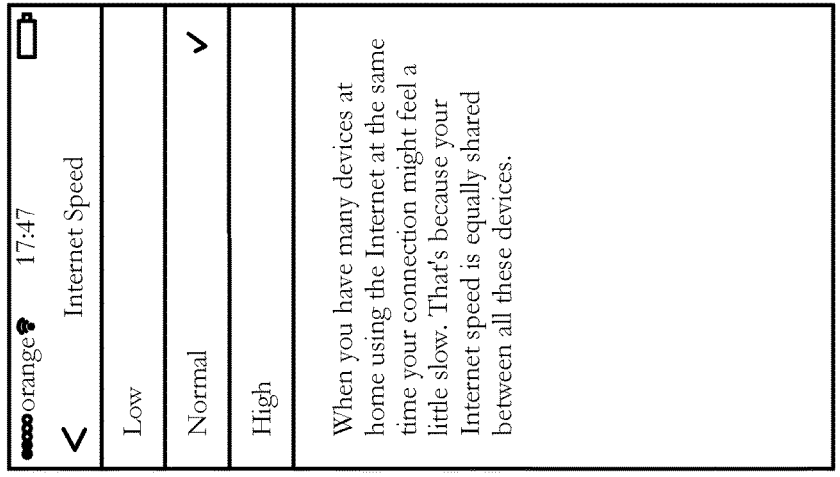
FIG. 17-B
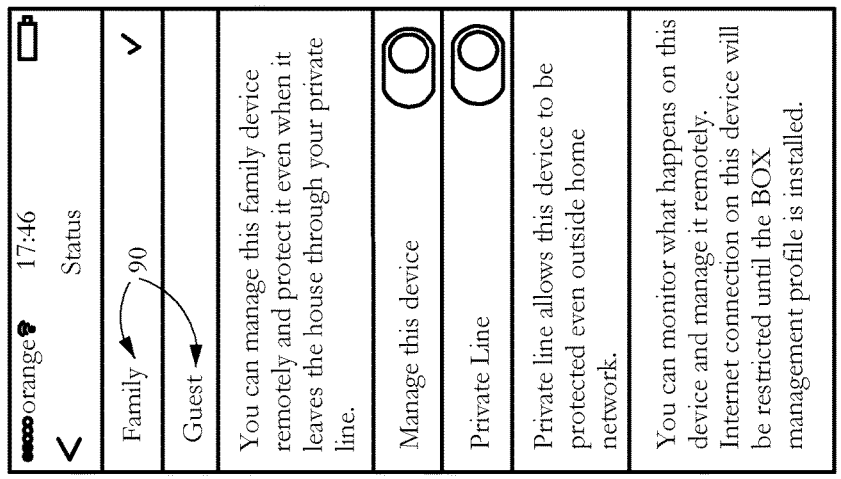
FIG. 17-A

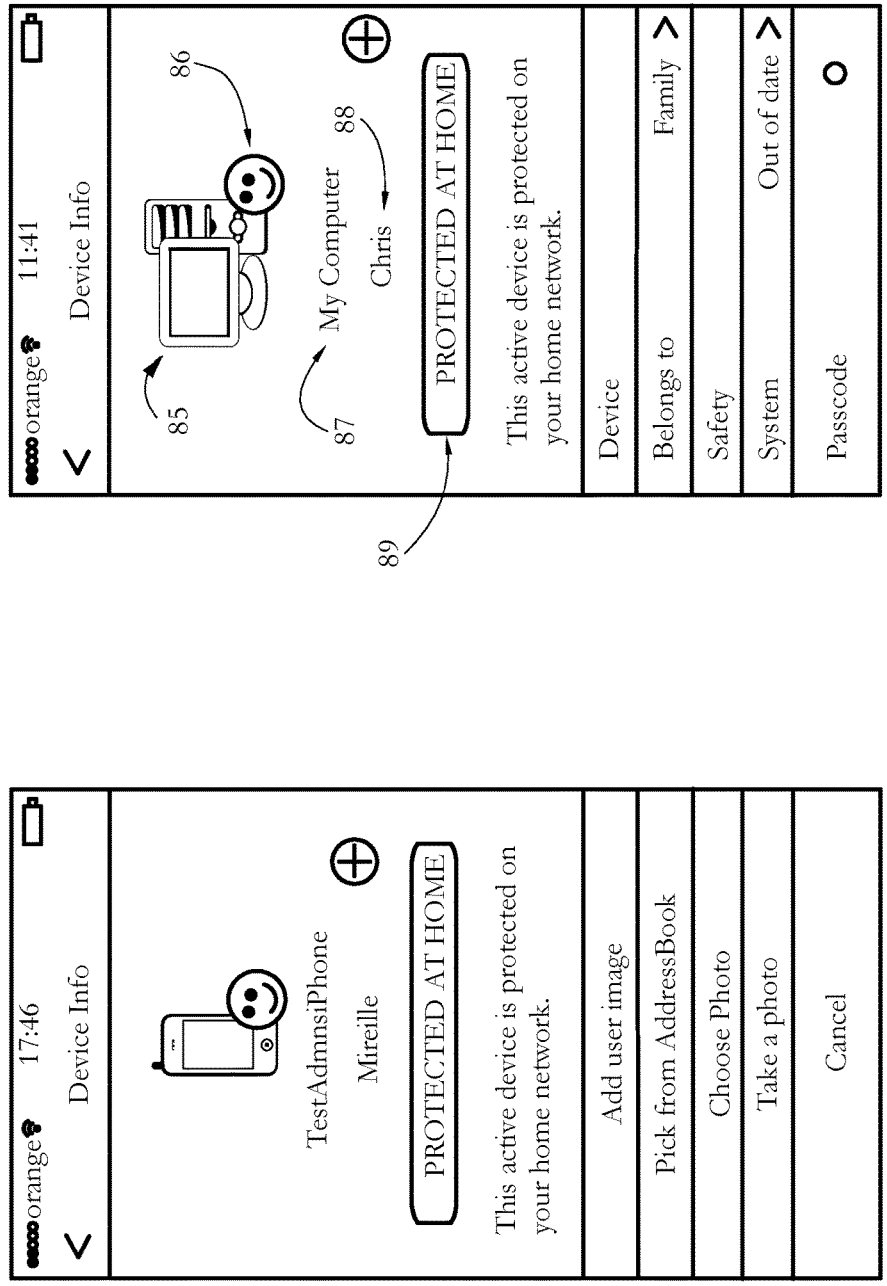

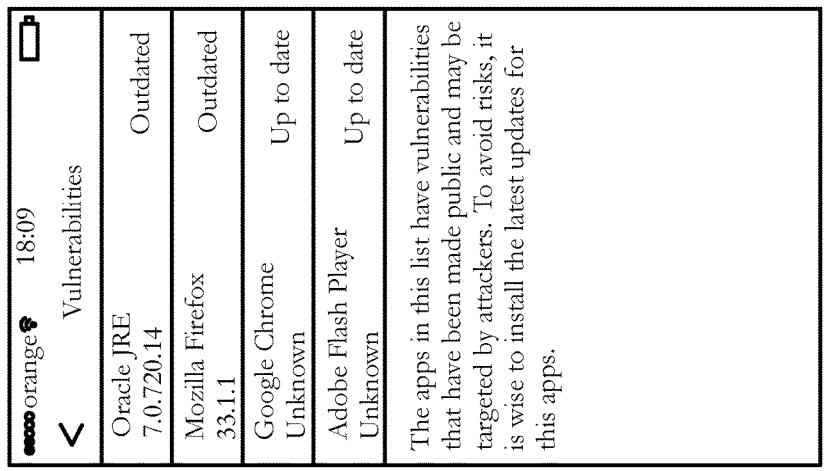
FIG. 20-B
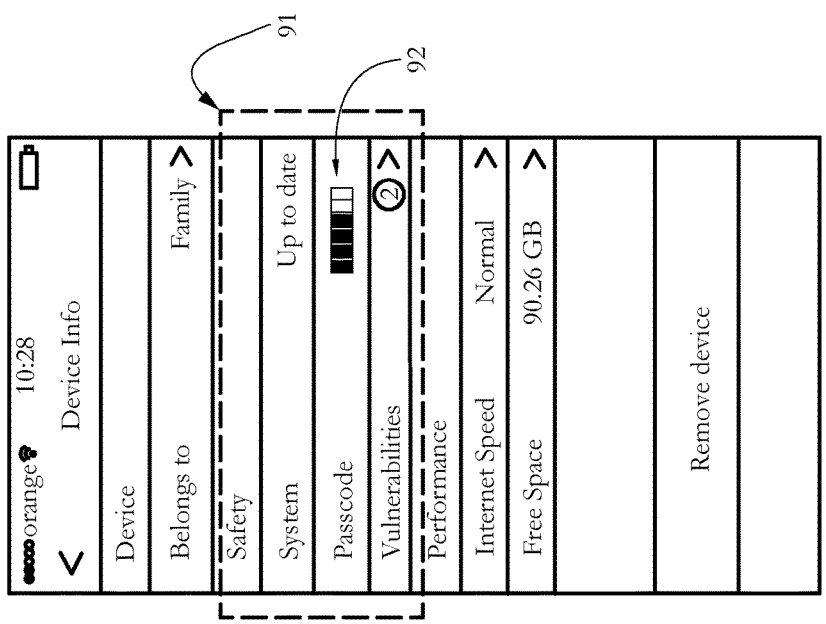
FIG. 20-A

| | |
|---|---|
| ●●●○○ orange 🔋 9:37 pm | 🔋 |
| Protected Devices | |
| Family (8) | Guest (0) |
| MacBook Pro retina<br>Dan Berte | > |
| Philips Hue<br>Home | > |
| Nest<br>Home | > |
| Chromebook computer<br>Home | > |
| Kindle tablet<br>Dan Berte | > |
| iPad<br>Dan Berte | > |
| Notifications  Devices  BOX | |

FIG. 21

| | |
|---|---|
| ●●●○○ orange 🔋 12:16 | 🔋 |
| Notifications | |
| Today | History |
| Activity Report<br>Activity boost in the last hour | Just now |
| New device found<br>HTC One S is connected to your<br>network | 6 hours ago |
| BOX is up-to-date<br>Your BOX is now up to date | 10 hours ago |
| BOX is up-to-date<br>Your BOX is now up to date | 12 hours ago |
| Get the newest BOX<br>Get the newest BOX | 12 hours ago |
| Notifications  Devices  BOX | |

FIG. 22-A

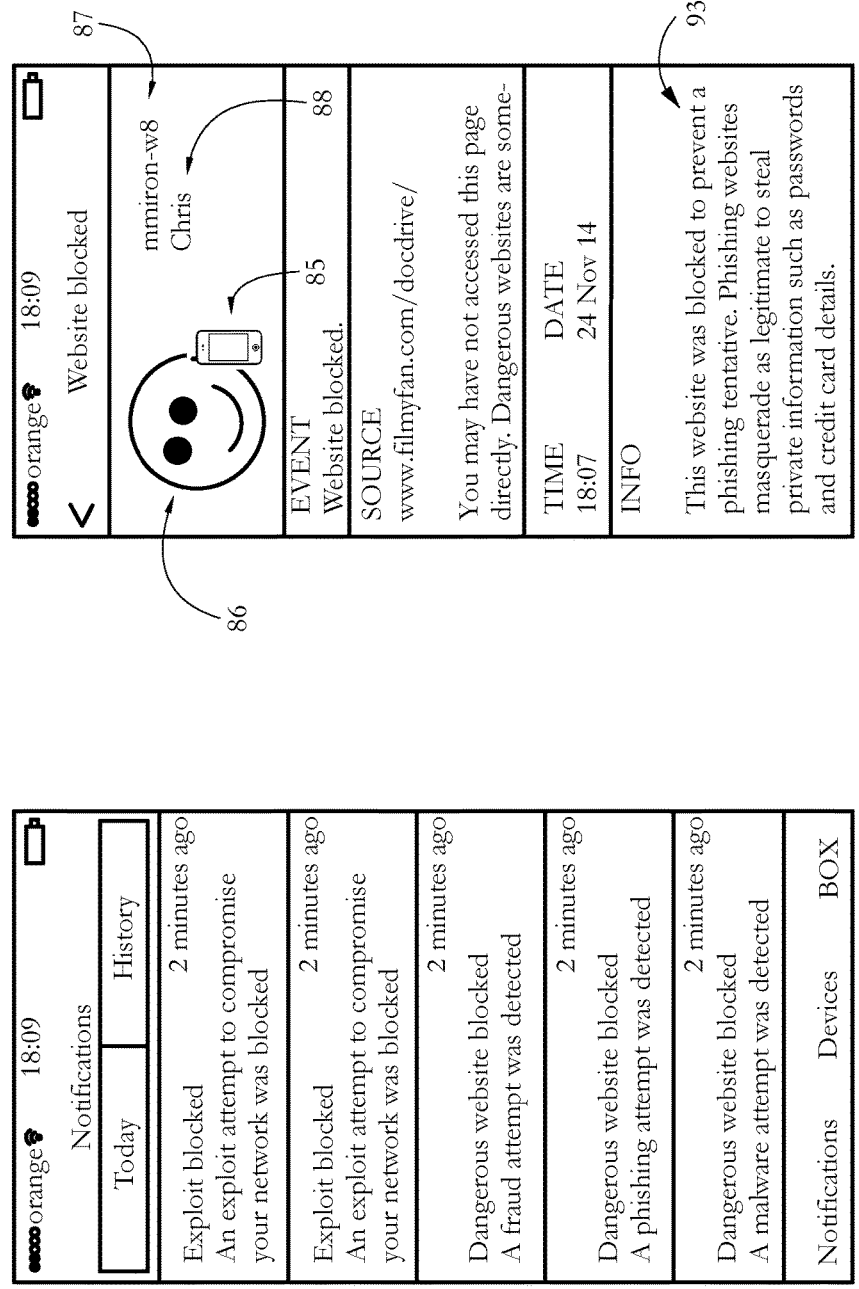

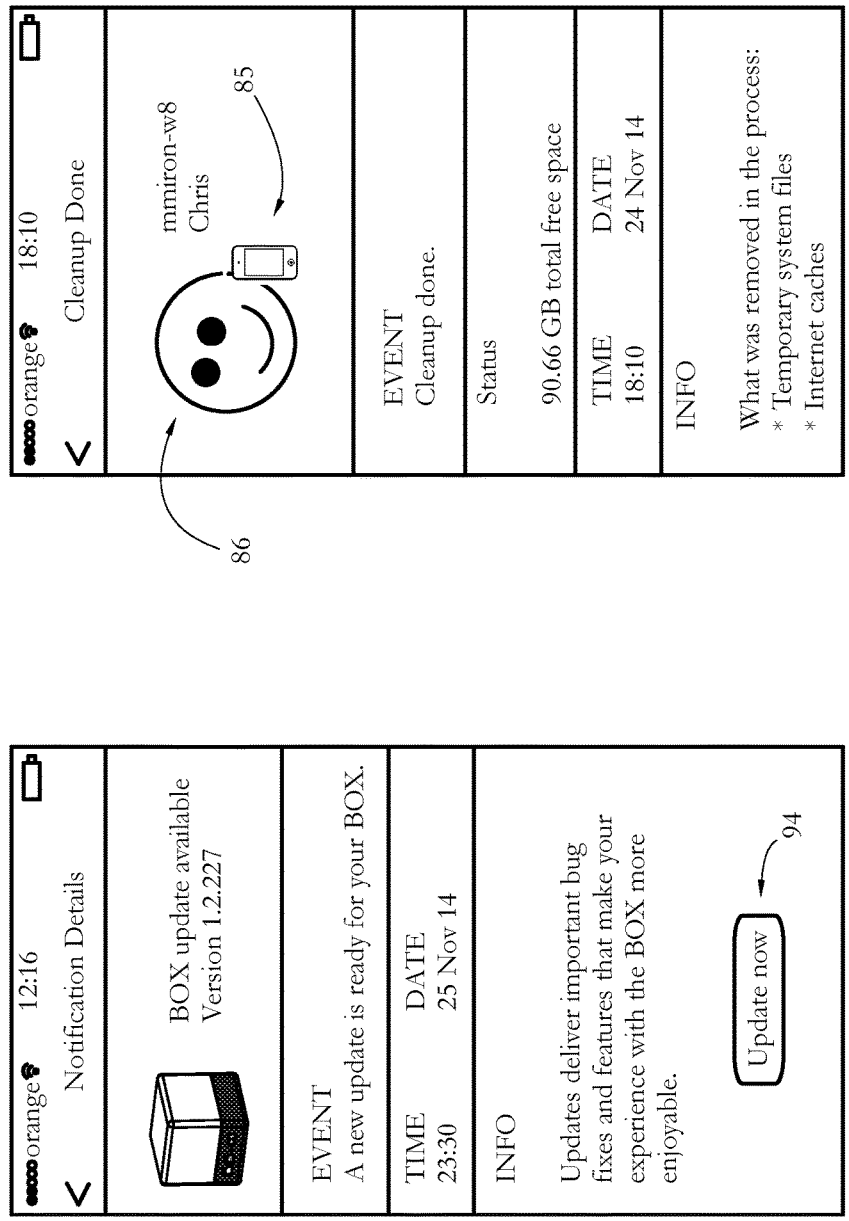
FIG. 24-B
FIG. 24-A

USER INTERFACE FOR SECURITY PROTECTION AND REMOTE MANAGEMENT OF NETWORK ENDPOINTS

RELATED APPLICATIONS

This application claims the benefit of the filing date of U.S. provisional patent applications No. 62/090,547, filed on Dec. 11, 2014, entitled "Systems and Methods for Securing Network Endpoints", No. 62/180,390, filed on Jun. 16, 2015, entitled "Systems and Methods for Automatic Device Detection, Device Management, and Remote Assistance", and No. 62/217,310, filed on Sep. 11, 2015, entitled "Systems and Methods for Automatic Network Service Takeover", the entire contents of which are incorporated by reference herein.

BACKGROUND

The invention relates to systems and methods for securing network endpoints against computer security threats, and to systems and methods for automatic device detection and remote device management.

Malicious software, also known as malware, affects a great number of computer systems worldwide. In its many forms such as computer viruses, exploits, and spyware, malware presents a serious risk to millions of computer users, making them vulnerable to loss of data and sensitive information, to identity theft, and to loss of productivity, among others.

A great variety of devices, informally referred to as the Internet of Things (IoT), are currently being connected to communication networks and the Internet. Such devices include, among others, smartphones, smartwatches, TVs and other multimedia devices, game consoles, home appliances, and various home sensors such as thermostats. As more such devices go online, they become targets for security threats. Therefore, there is an increasing need of securing such devices against malware, as well as of protecting communications to and from such devices.

In addition, the proliferation of such intelligent devices in environments such as homes and offices creates an increasing problem of device and network management. When each device uses a distinct configuration interface and requires separate connection settings, managing a large number of such devices may become a burden, especially for a typical home user who is not experienced in network administration. Therefore, there is an increasing interest in developing systems and methods for automatic device detection and configuration, with particular emphasis on security.

SUMMARY

According to one aspect, a computing system comprises a hardware processor and a memory, the memory storing instructions which, when executed by the hardware processor, cause the computing system to receive data from a remote server, the data selected by the server for transmission to the computing system according to a subscription associated with a network regulator protecting a plurality of client systems against computer security threats, wherein the plurality of client systems are connected to the network regulator over a local network. The instructions further cause the computing system to perform a display of a graphical user interface (GUI) configured to generate a device management view enabling a user to remotely configure a client system of the plurality of client systems, and further configured to generate a security notification view displaying an indicator of a security event caused by an action of the client system. The network regulator is configured, in response to connecting to a router providing a network service to the plurality of client systems, to automatically take over the network service from the router, wherein the network service comprises supplying network addresses to the plurality of client systems.

According to another aspect, a method comprises employing a network regulator to protect a plurality of client systems against computer security threats, wherein the plurality of client systems are connected to the network regulator over a local network. The method further comprises employing the network regulator, in response to connecting to a router providing a network service to the plurality of client systems, to automatically take over the network service from the router, wherein the network service comprises supplying network addresses to the plurality of client systems. The method further comprises, in response to the network regulator taking over the network service, employing a hardware processor of a computing system to receive data from a remote server, the data selected by the server for transmission to the computing system according to a subscription associated with the network regulator. The method further comprises, in response to the network regulator taking over the network service, employing the hardware processor to perform a display of a graphical user interface (GUI). The GUI is configured to generate a device management view enabling a user to remotely configure a client system of the plurality of client systems, and further configured to generate a security notification view displaying an indicator of a security event caused by an action of the client system.

According to another aspect, a non-transitory computer-readable medium stores instructions which, when executed by a hardware processor of a computing system, cause the computing system to receive data from a remote server, the data selected by the server for transmission to the computing system according to a subscription associated with a network regulator protecting a plurality of client systems against computer security threats, wherein the plurality of client systems are connected to the network regulator over a local network. The instructions further cause the computing system to perform a display of a graphical user interface (GUI). The GUI is configured to generate a device management view enabling a user to remotely configure a client system of the plurality of client systems, and further configured to generate a security notification view displaying an indicator of a security event caused by an action of the client system. The network regulator is configured, in response to connecting to a router providing a network service to the plurality of client systems, to automatically take over the network service from the router, wherein the network service comprises supplying network addresses to the plurality of client systems.

BRIEF DESCRIPTION OF THE DRAWINGS

The foregoing aspects and advantages of the present invention will become better understood upon reading the following detailed description and upon reference to the drawings where:

FIG. 1-A shows an exemplary configuration of client systems interconnected by a local network, and a network regulator protecting the client systems against computers security threats according to some embodiments of the present invention.

FIG. 1-B shows alternative configuration of client systems and network regulator according to some embodiments of the present invention.

FIG. 6-A illustrates an embodiment of the present invention, wherein a part of a network traffic is scanned at the security server according to some embodiments of the present invention.

FIG. 6-B shows an embodiment of the present invention, wherein a part of a network traffic is scanned by the network regulator according to some embodiments of the present invention.

FIG. 12 illustrates an exemplary sequence of steps performed by the administration device and/or security server to notify a user about the occurrence of an event involving a protected client system, according to some embodiments of the present invention.

FIG. 13-B shows further exemplary steps performed by the administration device to operate the client configuration GUI according to some embodiments of the present invention.

FIG. 15 shows an exemplary device management view generated by an administration GUI executing on the administration device according to some embodiments of the present invention. The view illustrates exemplary configurable parameters of the network regulator.

FIG. 16 shows another exemplary device management view according to some embodiments of the present invention. The view illustrates exemplary data displayed during the initial setup of a client system.

FIG. 17-A shows another exemplary device management view of the GUI, the view illustrating various device configuration options according to some embodiments of the present invention.

FIG. 17-B shows yet another exemplary device management view illustrating other device configuration options according to some embodiments of the present invention.

FIG. 18 shows an exemplary device management view enabling a user to associate an owner with the client system currently undergoing configuration, according to some embodiments of the present invention.

FIG. 19 shows an exemplary device management view illustrating a current state of a configured client system according to some embodiments of the present invention.

FIG. 20-A illustrates an exemplary device management view displaying vulnerability assessment information for a protected client system, according to some embodiments of the present invention.

FIG. 20-B shows an exemplary device management view displaying further vulnerability information according to some embodiments of the present invention.

FIG. 21 shows yet another exemplary device management view generated by the administration GUI, the view displaying a list of protected devices according to some embodiments of the present invention.

FIG. 22-A illustrates an exemplary notification view generated by the GUI, the view displaying a first part of a list of event notifications according to some embodiments of the present invention.

FIG. 22-B shows a second part of the list of event notifications according to some embodiments of the present invention.

FIG. 23 shows an exemplary notification view displaying details of a security event according to some embodiments of the present invention.

FIG. 24-A shows another exemplary notification view displaying a device maintenance event according to some embodiments of the present invention.

FIG. 24-B shows yet another exemplary notification view generated by the administration GUI, the view displaying another device maintenance event according to some embodiments of the present invention.

DETAILED DESCRIPTION

Figure 2:
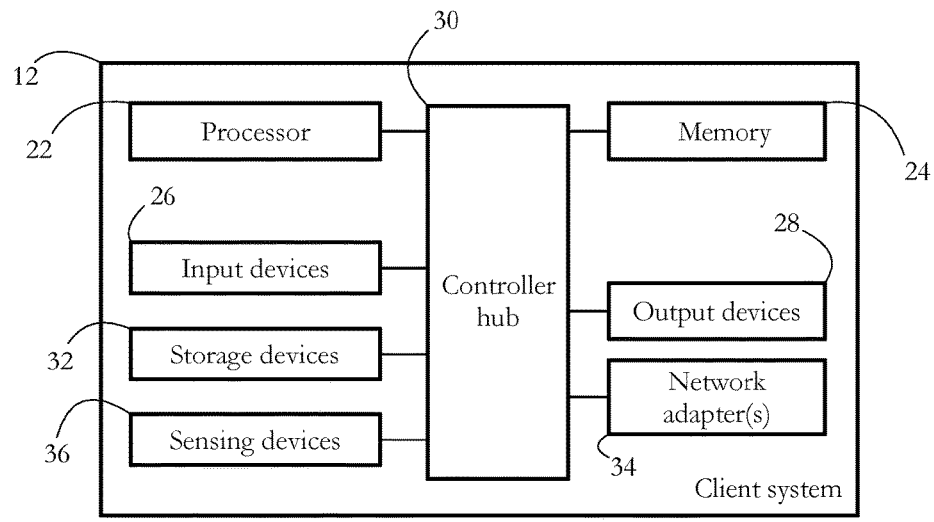
FIG. 2 illustrates an exemplary hardware configuration of a client system according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Two devices are said to be connected to or to belong to the same local network when their network addresses belong to the same subnet and/or when both have the same broadcast address. A tunnel is a virtual point-to-point connection between two entities connected to a communication network. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

FIG. 1-A-B show exemplary network configurations 10a-b according to some embodiments of the present invention, wherein a plurality of client systems 12a-f are interconnected by way of a local network 14, and further connected to an extended network 16, such as the Internet. Client systems 12a-f may represent any electronic device having a processor, a memory, and a communication interface. Exemplary client systems 12a-f include personal computers, laptops, tablet computers, mobile telecommunication devices (e.g., smartphones), media players, TVs, game consoles, home appliances (e.g., refrigerators, thermostats, intelligent heating and/or lighting systems), and wearable devices (e.g., smartwatches, sports and fitness equipment), among others. Local network 14 may comprise a local area network (LAN). Exemplary local networks 14 may include a home network and a corporate network, among others.

Router 19 comprises an electronic device enabling communication between client systems 12a-f and/or access of client systems 12a-f to extended network 16. In some embodiments, router 19 acts as a gateway between local network 14 and extended network 16, and provides a set of network services to client systems 12a-f. Unless otherwise specified, the term network services is used herein to denote services enabling the inter-communication of client systems 12a-f, as well as communication between client systems 12a-f and other entities. Such services may include, for instance, distributing network configuration parameters (e.g., network addresses) to clients systems 12a-f, and routing communication between participating endpoints. Exemplary network services implement a dynamic host configuration protocol (DHCP).

FIG. 1-A-B further show a network regulator 18 connected to local network 14. In some embodiments, network regulator 18 comprises a network appliance configured to perform various services for client systems 12a-f. Such services include, among others, computer security services (e.g., anti-malware, intrusion detection, anti-spyware, etc.), device management (e.g., remote configuration of client systems 12a-f), parental control services, secure communication services (e.g., virtual private networking—VPN), and remote technical assistance (e.g., device and/or network troubleshooting).

In a typical application according to some embodiments of the present invention, network regulator 18 is introduced to a local network already configured and managed by router 19. In some embodiments, at installation, regulator 18 takes over network services such as DHCP from router 19 and installs itself in a gateway position between local network 14 and extended network 16, so that at least a part of the traffic between client systems 12a-f and extended network 16 traverses network regulator 18 (see FIG. 1-A). Placing network regulator 18 in a gateway position may be preferable because, in some embodiments, regulator 18 provides computer security services by redirecting at least some of the traffic (e.g., HTTP requests) from client systems 12a-f to a security server. Having regulator 18 in a gateway position may facilitate the interception of such traffic.

In some embodiments such as the example in FIG. 1-B, router 19 may continue to operate as gateway for local network 14 after installation of regulator 18, but in such cases network regulator 18 is preferably positioned between client systems 12a-f and the existing gateway (i.e., router 19), so that regulator 18 belongs to the same local network as client systems 12a-f. Such a position is preferred because, in some embodiments, network regulator 18 is configured to collaborate with a remote server to detect the type of each client system (e.g., smartphone vs. PC), and in response, to deliver a device-specific utility agent to some of client systems 12a-f. Configurations wherein regulator 18 is not a member of local network 14 (e.g., placing regulator 18 between router 19 and extended network 16) may make such device discovery and agent delivery more difficult.

In some embodiments, client systems 12a-f are monitored, managed, and/or configured remotely by a user/administrator, using software executing on an administration device 20 connected to extended network 16 (e.g., the Internet). Exemplary administration devices 20 include smartphones and personal computer systems, among others. Device 20 may expose a graphical user interface (GUI) allowing a user to remotely configure and/or manage operation of client systems 12a-f, for instance to set configuration options and/or to receive notifications about security-related events occurring on the respective client systems.

Figure 3:
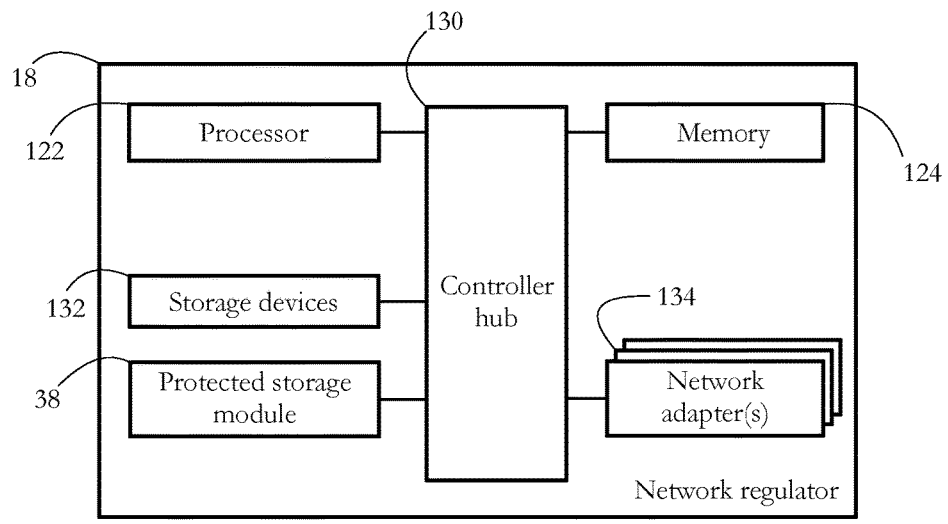
FIG. 3 illustrates an exemplary hardware configuration of a network regulator according to some embodiments of the present invention.
Figure 4:
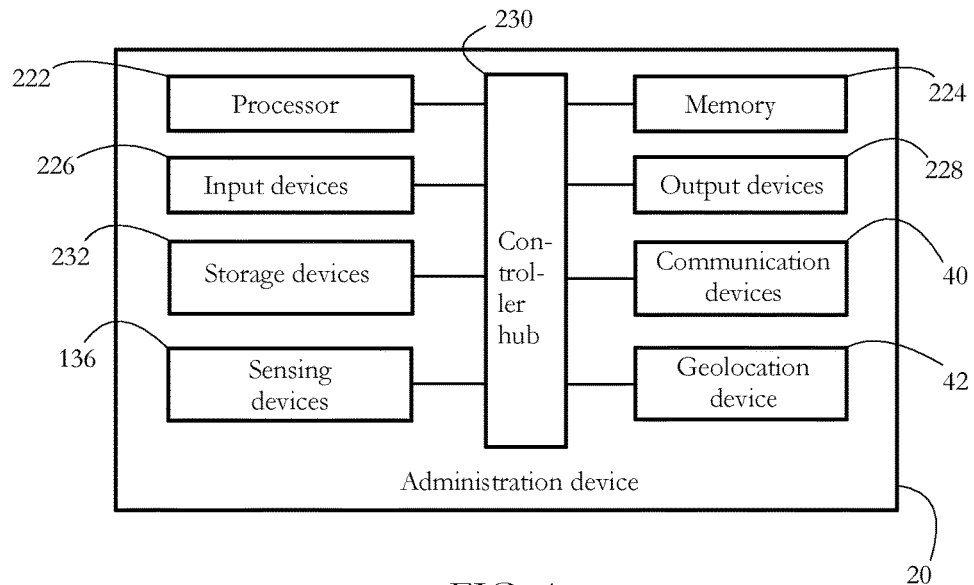
FIG. 4 illustrates an exemplary hardware configuration of an administration device according to some embodiments of the present invention.

FIGS. 2-3-4 show exemplary hardware configurations of a client system 12, network regulator 18, and administration device 20, respectively. Without loss of generality, the illustrated configurations correspond to computer systems (FIGS. 2-3) and a smartphone (FIG. 4). The hardware configuration of other systems (e.g., tablet computers) may differ from the ones illustrated in FIGS. 2-3-4. In some embodiments, each of processors 22, 122, and 222 comprises a physical device (e.g. microprocessor, multi-core integrated circuit formed on a semiconductor substrate) configured to execute computational and/or logical operations with a set of signals and/or data. Memory units unit 24, 124, and 224 may comprise volatile computer-readable media (e.g. RAM) storing data/signals accessed or generated by processors 22, 122, and 222, respectively, in the course of carrying out operations.

Input devices 26, 226 may include computer keyboards, mice, and microphones, among others, including the respective hardware interfaces and/or adapters allowing a user to introduce data and/or instructions into the respective system. Output devices 28, 228 may include display devices such as monitors and speakers among others, as well as hardware interfaces/adapters such as graphic cards, allowing the respective system to communicate data to a user. In some embodiments, input and output devices share a common piece of hardware (e.g., touch-screen). Storage devices 32, 132, and 232 include computer-readable media enabling the non-volatile storage, reading, and writing of software instructions and/or data. Exemplary storage devices include magnetic and optical disks and flash memory devices, as well as removable media such as CD and/or DVD disks and drives.

Network adapters 34, 134 enable client system 12 and network regulator 18, respectively, to connect to an electronic communication network such as local network 14, and/or to other devices/computer systems. Communication devices 40 (FIG. 4) enable administration device 20 to connect to extended network 16 (e.g., the Internet), and may include telecommunication hardware (electromagnetic wave emitters/receivers, antenna, etc.). Depending on device type and configuration, administration device 20 may further include a geolocation device 42 (e.g. GPS receiver), and a set of sensing devices 136 (e.g., motion sensors, light sensors, etc.).

Controller hubs 30, 130, 230 represent the plurality of system, peripheral, and/or chipset buses, and/or all other circuitry enabling the communication between the processor of each respective system and the rest of the hardware components. In an exemplary client system 12 (FIG. 2), hub 30 may comprise a memory controller, an input/output (I/O) controller, and an interrupt controller. Depending on hardware manufacturer, some such controllers may be incorporated into a single integrated circuit, and/or may be integrated with the processor.

In some embodiments, network regulator 18 further comprises a protected storage module 38. Module 38 may comprise a hardware device (for instance a persistent memory circuit) configured to securely store sensitive information. Module 38 may be configured so that software executing on the network regulator may not overwrite a content of module 38. The secure storage may be used to store a cryptographic key uniquely associated with the respective network regulator (such keys are known as endorsement keys in some embodiments). In some embodiments, protected storage module 38 also comprises a cryptographic processor configured to generate cryptographic keys, to compute hashes, and/or to perform encryption/decryption of data. Exemplary protected storage modules 38 include trusted platform module (TPM) chips produced by various hardware manufacturers. In an alternative embodiment, protected storage module 36 may be software-emulated, for instance using ARM TrustZone® technology.

In some embodiments, network regulator 18 comprises an identification token, which may be used to uniquely identify the respective network regulator from among a plurality of similar devices. Each identification token may be associated with a subscription or service account. In some embodiments, the identification token is stored in protected storage module 38 of regulator 18.

Figure 5:
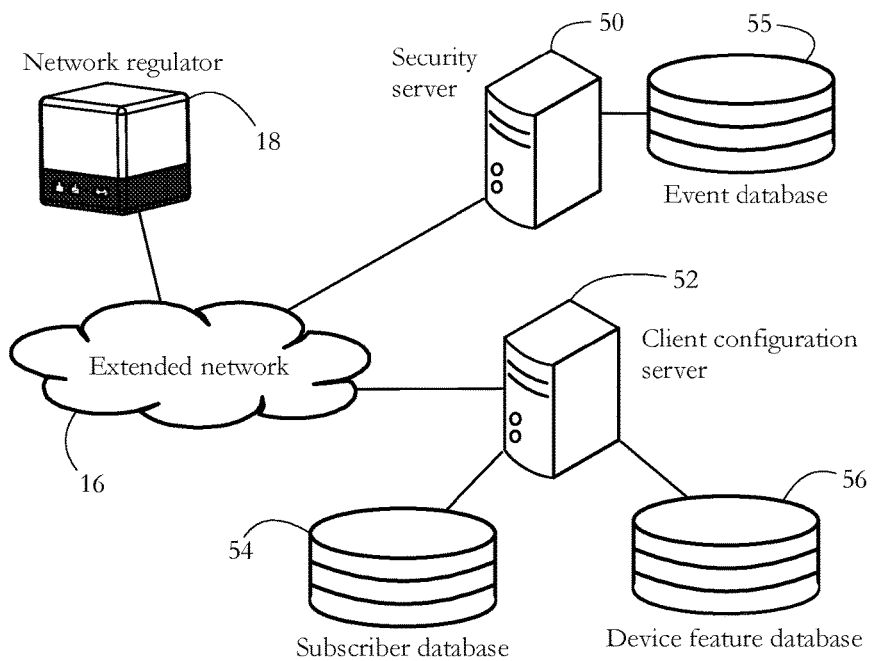
FIG. 5 shows a set of remote servers collaborating with the network regulator to protect client systems from computer security threats, according to some embodiments of the present invention.

In some embodiments, network regulator 18 may collaborate with a set of remote computer systems to protect client systems 12a-f from computer security threats. Such threats include, among others, malicious software (e.g., viruses, Trojans, spyware), network intrusion by unauthorized third parties, data theft, traffic surveillance, and electronic fraud. Exemplary remote computer systems include a security server 50 and a client configuration server 52, illustrated in FIG. 5. Servers 50 and 52 may comprise individual machines, or clusters of multiple interconnected computer systems. In some embodiments, security server 50 performs threat detection operations (e.g., malware detection, intrusion prevention, etc.), to detect security events involving a protected client system, such as client systems 12a-f in FIG. 1-A-B. Security server 50 may be further connected to an event database comprising a plurality of security records, each security record including data indicative of a security event, as well as an indicator of an association between the respective event and a protected client system 12.

In some embodiments, configuration server 52 collaborates with administration device 20 to configure device management and/or security settings of regulator 18, router 19, and/or of a protected client system 12. Server 52 may be communicatively connected to a subscriber database 54 and to a device feature database 56. Subscriber database 54 may store a plurality of subscription records, each subscription record indicative of a set of client systems under device management according to some embodiments of the present invention. In one embodiment, each subscription record is uniquely associated with a distinct network regulator 18. In such embodiments, all client systems 12 configured and/or otherwise serviced using the respective network regulator (e.g., client systems 12a-f connected to local network 14 in FIG. 1-A) are associated with the same subscription record. Each subscription record may include an indicator of a subscription period and/or a set of subscription parameters describing, for instance, a desired level of security or a selection of services subscribed for. Subscriptions may be managed according to a service-level agreement (SLA).

In some embodiments, device feature database 56 comprises a set of records indicating configurable features of each client system 12 and/or current configuration settings for each client system. Database 56 may further comprise a comprehensive set of records usable to determine a device type of client system 12. Such records may include entries corresponding to various device types (e.g., routers, smartphones, wearable devices, etc.), makes, and models, from various manufacturers, using various operating systems (e.g., Windows® vs. Linux®). An exemplary entry may comprise, among others, indicators of whether the respective device type uses a particular network protocol to communicate (e.g., HTTP, Bonjour®), an indicator of a layout of a login interface exposed by the respective device type, etc.

FIG. 6-A-B show exemplary embodiments wherein network regulator 18 collaborates with security server 50 to protect client systems 12a-f from computer security threats such as malware, adware, spyware, and network intrusion. In the embodiment of FIG. 6-A, network regulator 18 re-routes some or all of the data traffic (herein illustrated by network packet 60) between protected client system 12 and a computer system external to the local network through security server 50. Such re-routing may be achieved, for instance, by installing network regulator 18 as gateway between local network 14 and extended network 16, and using regulator 18 to intercept network traffic and actively redirect it to server 50. In embodiments as illustrated in FIG. 6-A, threat detection is performed by security server 50, using any method known in the art (e.g., by analyzing network packets 60 to determine whether they contain malware, or whether they are indicative of a network intrusion).

In some embodiments, as illustrated in FIG. 6-B, threat detection is performed by network regulator 18. Such local detection may comprise, for instance, filtering packet content. Regulator 18 may keep malware detection algorithms up to date by downloading a set of filter parameters 62 (e.g. malware-indicative signatures) from security server 50. Some embodiments may combine threat detection on regulator 18 with threat detection at security server 50. In one such example, network regulator 18 may carry out a preliminary analysis of data traffic, using, for instance, relatively inexpensive methods. Regulator 18 may then send suspect network packets for further analysis to server 50.

Re-routing traffic through security server 50 (FIG. 6-A) may have several advantages over performing a local security analysis (FIG. 6-B). Server 50 may comprise multiple purpose-built, high-throughput computer systems, and may therefore be able to carry out computationally intensive traffic analysis, such as deep packet inspection, much more efficiently than regulator 18. Installing such capabilities in network regulator 18 would substantially increase the price, complexity, and attack surface of regulator 18. Another advantage of having centralized data analysis is that such configurations eliminate the need to distribute updates of malware-identifying signatures and of other data used in network packet analysis to a large number of distributed network regulators 18. Centralized security systems are also typically better equipped to respond to newly discovered threats.

An exemplary application of such computer security systems and methods comprises blocking access of a protected client system to malicious or fraudulent webpages. In one such example, a request to access a remote resource (e.g., a HTTP request from a protected client system) is intercepted and analyzed to determine whether access to the remote resource, webpage, etc., represents a computer security risk. Such analysis may use any method known in the art, for instance matching an address of the respective resource against a blacklist of known malicious or fraudulent webpages, analyzing the layout of the respective webpage, etc. The analysis may be carried out at security server 50 (e.g., in a configuration as shown in FIG. 6-A) or at network regulator 18 (e.g., as shown in FIG. 6-B). When the analysis establishes that accessing the remote resource does not amount to a computer security risk, the respective client system is allowed access to the respective remote resource. When access is deemed risky, the requesting client system may be blocked from accessing the respective resource. In addition to blocking access, some embodiments of security server 50 send an event notification to administration device 20, informing the user/administrator of network regulator 18 that a security event has occurred. The notification may include an indicator of the client system involved in the respective event, and an indicator of a type of event (e.g., access to a fraudulent web site).

Figure 7:
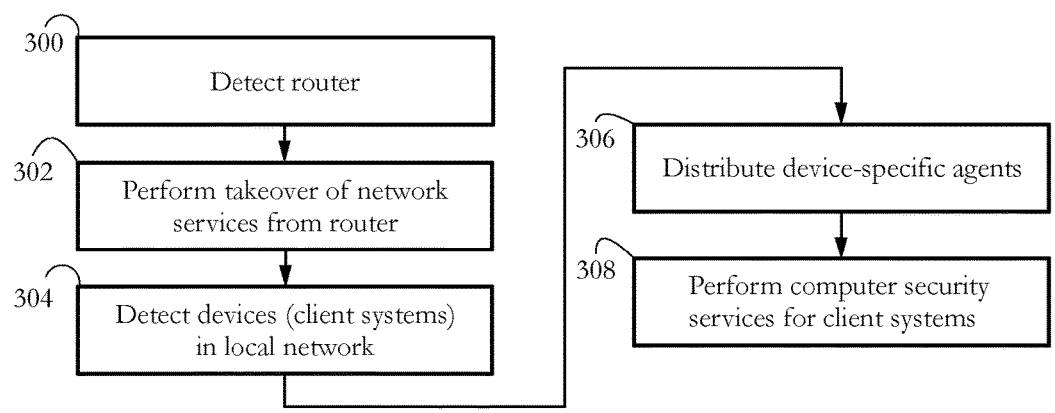
FIG. 7 shows an exemplary sequence of steps performed by the network regulator according to some embodiments of the present invention.

FIG. 7 shows a sequence of steps executed by network regulator 18 according to some embodiments of the present invention. Such a sequence may be executed, for instance, upon installation of network regulator 18, or when regulator 18 is first introduced to local network 14. In a step 300, regulator 18 automatically detects router 19, herein representing the existing provider of network services. In some embodiments, regulator 18 then takes over some of the network services from router 19. Such takeover may comprise shutting off or otherwise incapacitating some of the functionality of router 19 (e.g. a Dynamic Host Configuration Protocol DHCP server of router 19), and replacing router 19 as the provider of at least a part of the network services associated with local network 14. In an alternative embodiment, service takeover may comprise offering an alternative set of network services in addition to those managed by router 19, without actually incapacitating the latter. One exemplary takeover scenario comprises network regulator 18 impersonating a set of fictitious devices (aliases) and exploiting an address conflict detection (ACD) mechanism to progressively force clients 12a-f to relinquish their currently assigned network addresses. In one such example, regulator 18 may listen for an address availability probe issued by either a client system 12a-f or router 19. Such address availability probes enable the sender to determine whether the respective address is currently in use. In response to detecting such a probe, regulator 18 may return a reply to the sender of the respective probe, the reply configured to indicate that the respective network address is currently not available (i.e., is in use). By repeating the sequence of steps described above for each client system 12a-f, network regulator 18 may successfully disable network services offered by router 19 and force client systems 12a-f to use a new set of network addresses issued by regulator 18. In some embodiments, step 302 further comprises installing network regulator 18 in a gateway position between local network 14 and extended network 16, so that at least a part of network traffic between client systems 12a-f and extended network 16 traverses regulator 18.

In a sequence of steps 304-306, network regulator 18 may automatically detect devices belonging to local network 14 (i.e., client systems 12a-f), and distribute device-specific utility agents 41 to at least some of client systems 12a-f. A broad variety of utility agents may be provisioned using systems and methods described herein. Examples include computer security agents, parental control agents, and remote technical assistance agents, among others. A further step 308 performs a set of computer security services for client systems 12a-f.

Figure 8:
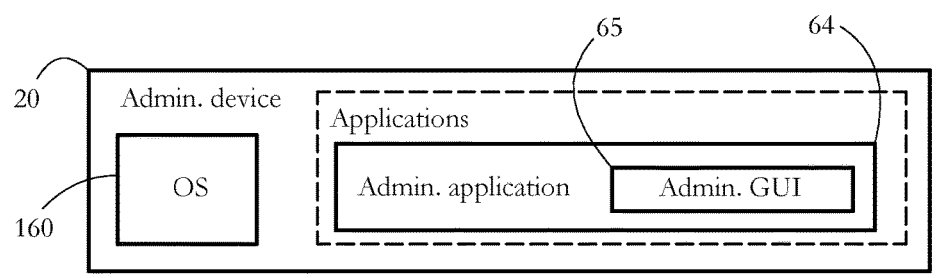
FIG. 8 shows exemplary software components executing on the administration device according to some embodiments of the present invention.

FIG. 8 shows an exemplary set of software components executing on administration device 20 (e.g., a smartphone), according to some embodiments of the present invention. Such software components may include an operating system 63 and a set of applications. Applications include an administration application 64 configured to enable a user to remotely configure protection of client systems 12a-f. Configuring protection of systems 12a-f may include, among others, configuring client-specific security settings, configuring client-specific network access parameters (e.g., connection speed, etc.), and launching maintenance tasks (e.g., software upgrades, disk cleanup operations, etc.). Administration application 64 may expose an administration graphical user interface (GUI) 65 to a user of administration device 20. The operation of GUI 65 is further illustrated below.

Figure 9:
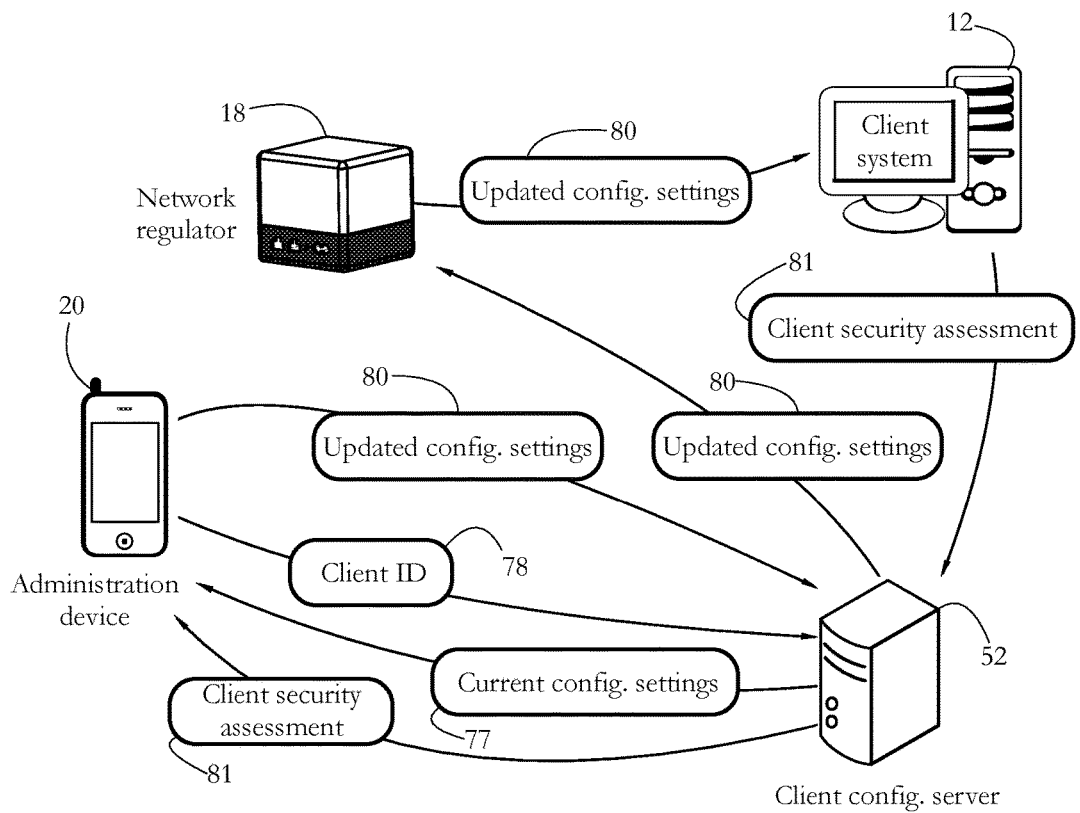
FIG. 9 shows an exemplary data exchange between a client system, the network regulator, the client configuration server, and the administration device according to some embodiments of the present invention, the data exchange occurring as part of configuring the respective client system.
Figure 10:
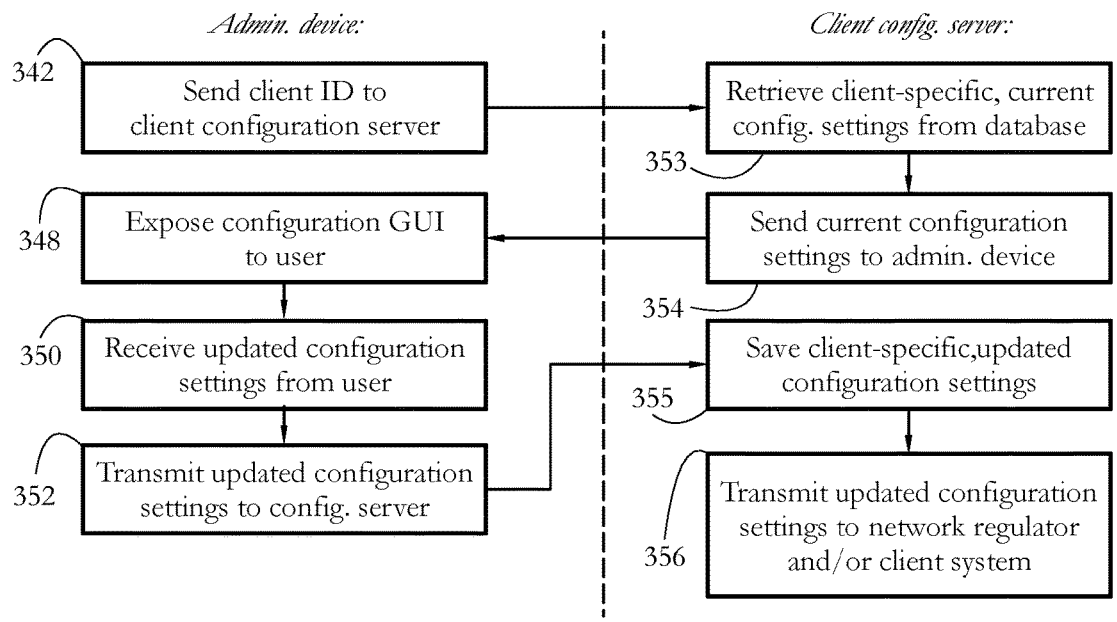
FIG. 10 illustrates an exemplary sequence of steps performed by the administration device and/or client configuration server to configure a client system according to some embodiments of the present invention.

FIGS. 9-10 show an exemplary data exchange and a sequence of steps, respectively, occurring as part of remotely configuring protection of client system 12. Such exchanges may occur during the initial configuration of client system 12, or for subsequent parameter changes. Client system 12 may be configured remotely by an administrator via administration GUI 65 exposed on administration device 20. For this purpose, GUI 65 may generate a device management view displaying a plurality of configurable parameters used by client system 12 and/or by network regulator 18 to protect the respective client system. The device management view further enables the administrator to select desired values for such parameters. In some embodiments, configurable parameters may be device-specific, for instance, may vary between a computer system and a smartphone. Also, configurable parameters may differ between devices running different operating systems (e.g., Windows® vs. iOS® or Android). In some embodiments, server 52 maintains a database of device-specific configuration parameters (e.g., device feature database 56, FIG. 5) and a database of current parameter values for each protected client system 12 (e.g., subscriber database 54).

In some embodiments, device 20 obtains a list of current configurable parameter and/or parameters values (e.g., current configuration settings 77 in FIG. 9) from configuration server 52. To selectively retrieve client-specific configuration parameters and/or parameter values from databases 54-56, some embodiments of server 52 use a client ID 78 received from administration device 20 as a lookup key. Client ID 78 may uniquely identify each protected client system, and may also include an identifying token of network regulator 18 controlling the local network to which the respective client system is currently connected. The client ID may be obtained by server 52 and/or administration device 20 during device discovery of client system 12.

In response to the administrator's entering changes to the configuration parameters into administration GUI 65, a set of updated configuration settings 80 is sent from administration device 20 to server 52, which may forward updated settings 80 to network regulator 18 and/or to the respective client system 12. Some such settings may configure network regulator 18 (e.g. to set a limit on the connection speed and/or on the amount of data transferred to/from the respective client system). Other settings may configure client system 12 directly (e.g., to order a software update, to set a thermostat to a new temperature, etc.).

In some embodiments, a client management agent executing on client system 12 may perform a security assessment of client system 12 and may send assessment data to client configuration server 52 or security server 50. The server(s) may then forward client security assessment 81 to administration device 20 for display to the administrator. An exemplary security assessment 81 may include, among others, an indicator of whether a particular software object executing on client system 12 is up to date, and an indicator of a quality of a password used to protect client system 12.

Figure 11:
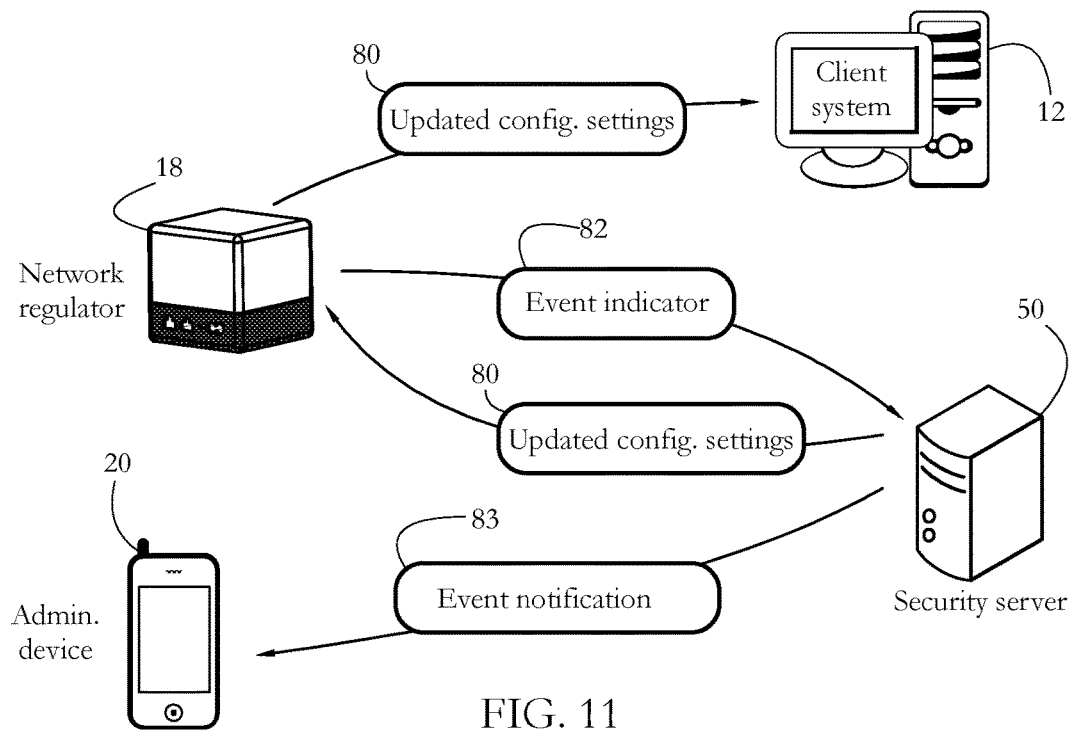
FIG. 11 shows an exemplary data exchange between a client system, the network regulator, the security server, and the administration device according to some embodiments of the present invention, the data exchange occurring as part of event notification.

In some embodiments, GUI 65 may further generate a notification view displaying a set of notifications, each such notification communicating to the administrator the occurrence and details of an event. The event may be a security event (e.g., a blocked phishing attempt), a device management event (e.g., a software update, an arming or disarming of a home security system), etc. FIG. 11 shows an exemplary data exchange occurring during event notification. In some embodiments, the event is detected either by security server 50 or by network regulator 18. When the event was detected at network regulator 18, regulator 18 may transmit an event indicator 82 to security server 50. Server 50 may further formulate and communicate an event notification 83 to administration device 20 for display to the administrator. In some embodiments, notification 83 is communicated to device 20 using a push protocol. In response to the event, security server 50 and/or administration device 20 may operate changes to the configuration parameters used by client system 12 and/or network regulator 18 to protect client system 12. In one such example, when server 50 determines that client system 12 comprises malware, it may instruct network regulator 18 to restrict access of the respective client system to networks 14 and/or 16. Such configuration changes may be communicated as updated configuration settings 80. FIG. 12 shows an exemplary sequence of steps performed by security server 50 and/or administration device 20 to carry out an event notification.

Figure 13:
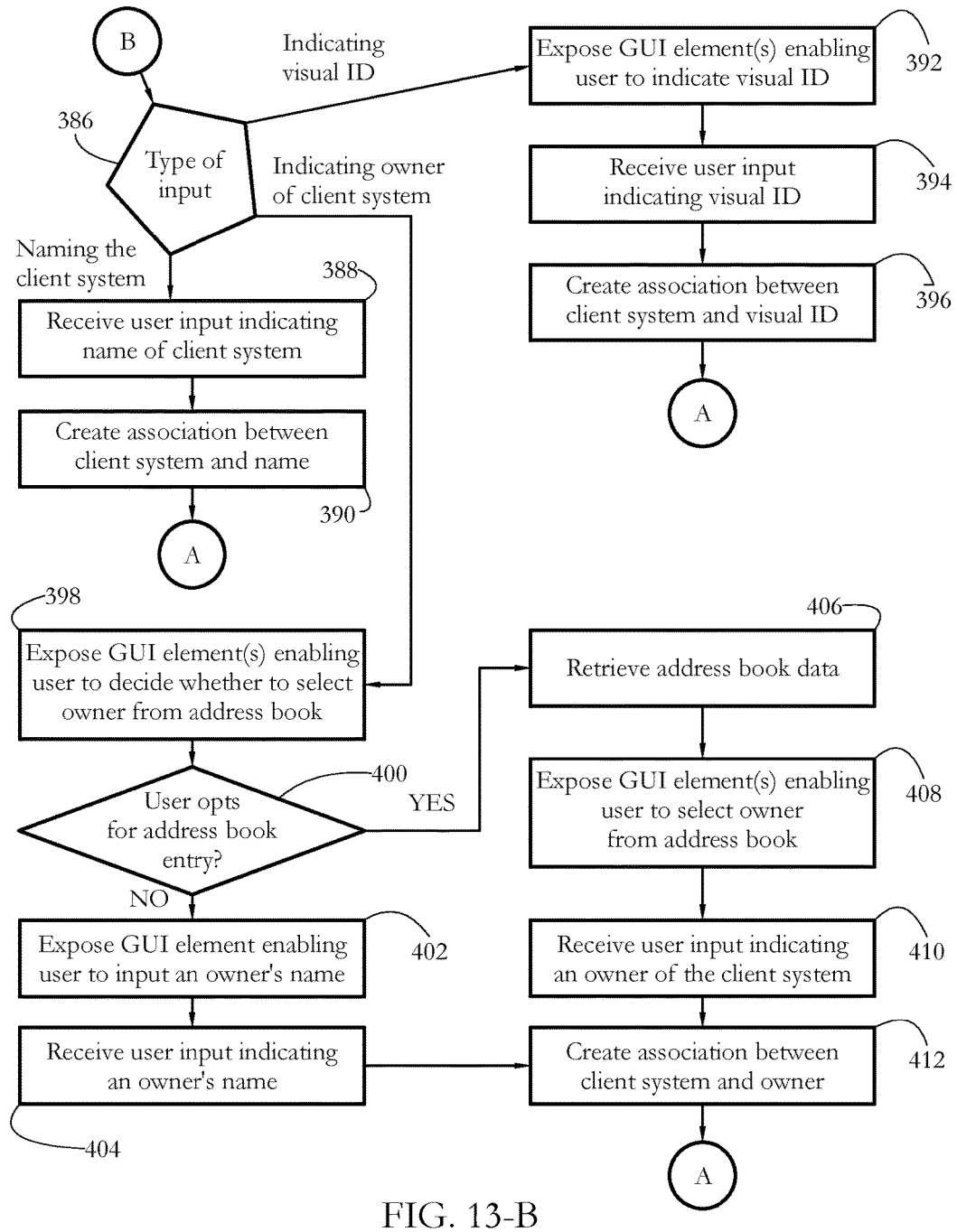
FIG. 13-A shows an exemplary sequence of steps performed by the administration device to operate a client configuration graphical user interface (GUI) according to some embodiments of the present invention.

FIG. 13-A-B show an exemplary sequence of steps performed by administration application 64 according to some embodiments of the present invention. Application 64 exposes GUI 65, which enables the administrator to remotely manage client system 12 and/or to configure protection of client system 12. In a device management view, some embodiments of GUI 65 enable the administrator to associate a device name, a visual ID, and an owner with each protected client system. Exemplary visual IDs include, among others, a photograph of the owner, an icon (e.g., symbol, avatar) of the owner, a photograph of the respective client system, or an arbitrary image used as a mnemonic for the owner and/or the respective client system. The GUI may subsequently represent the respective client system using the respective name, visual ID, etc.

Such associations between the protected client system and a visual ID/icon may facilitate device administration, especially when the administrator is not particularly skilled in system or network administration or computer security. In particular, some embodiments allow the administrator to associate each protected client system with an address book entry. When administration device 20 is a smartphone, such associations provide a quick and convenient mechanism of contacting the owner of a protected system, for instance to communicate the occurrence of a security event, or to enquire about a security event involving the respective client system.

Figure 14:
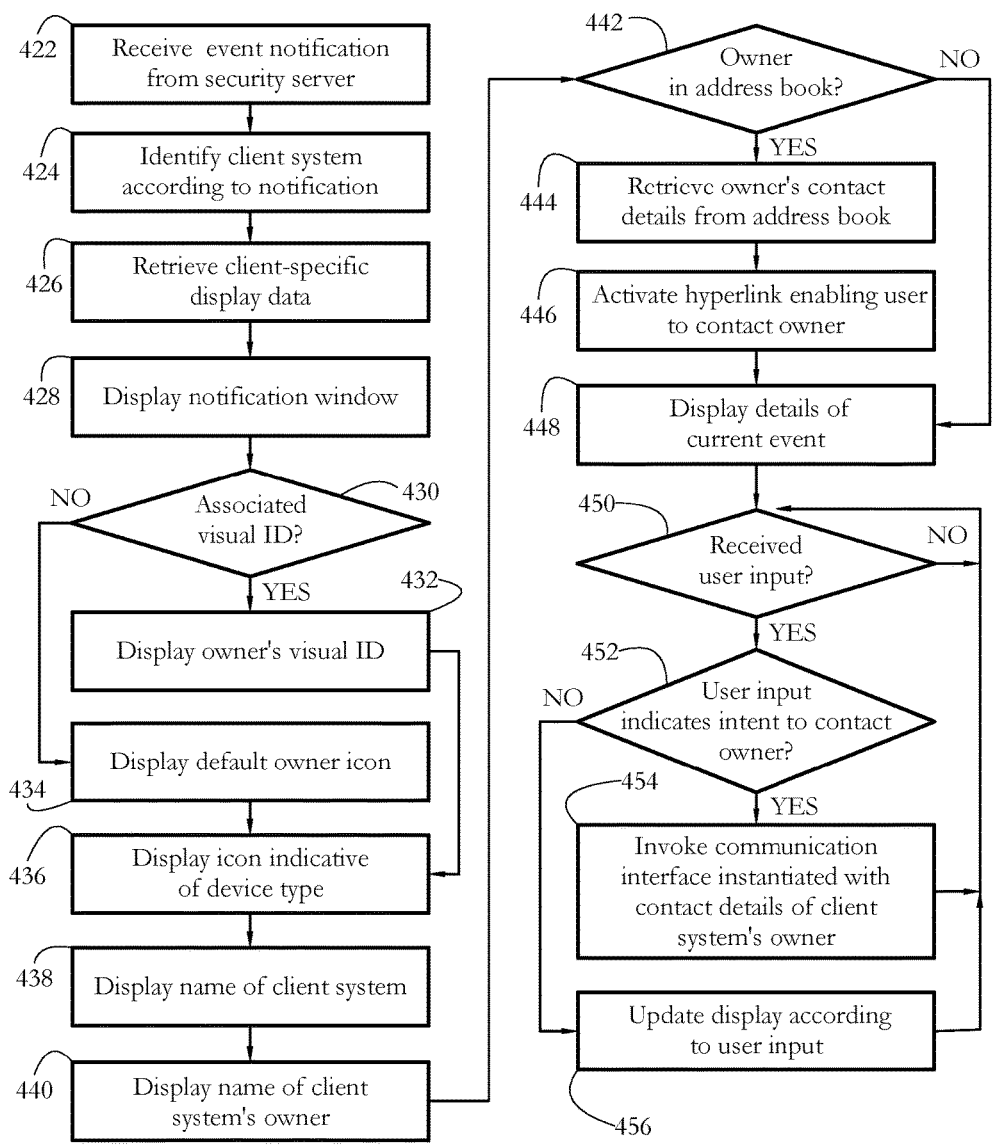
FIG. 14 shows an exemplary sequence of steps performed by the administration device to operate a notification GUI according to some embodiments of the present invention.

FIG. 14 shows an exemplary sequence of steps performed by administration application 64 to display an event notification within GUI 65, according to some embodiments of the present invention. Displaying the notification may comprise displaying a device name and a name of the owner of the respective client system, and displaying a visual ID (icon) associated with the owner. Also, in some embodiments, the name and/or icon of the owner may be hyperlinked to a communication interface of device 20 (e.g., a telephone call interface, e-mail interface, messaging interface, etc.). When the administrator activates (e.g., clicks, touches) the respective hyperlink, the respective communication interface may be invoked, instantiated with the contact details of the owner of the client system indicated by the current notification.

FIG. 15 shows a snapshot of a device management view generated by GUI 65 according to some embodiments of the present invention. FIG. 15 shows an exemplary display of information related to network regulator 18. GUI 65 may display a top-level menu including buttons 84a-c that invoke a notification GUI, a device status/configuration GUI, and a service/subscription information GUI, respectively.

FIG. 16 shows another exemplary snapshot of the device management view, the snapshot illustrating an initial configuration (setup) of a protected client system—in this case, a thermostat. The exemplary device management view displays a device icon 85 indicative of the respective client system, an owner icon 86 associated with the owner, and a device name 87 of the respective client system. FIG. 17-A-B show device configuration screens accessed via the interface illustrated in FIG. 16. The interface illustrated in FIG. 17-A enables the administrator to assign the current client system to a pre-determined device group 90 (e.g., family/guest). In some embodiments, members of each device group 90 have group-specific values of configuration parameters. For instance, in some embodiments, for members of the "guest" group, GUI 65 does not allow configuration of device management parameters. In the example of FIG. 17-A, for members of the "family" group, GUI 65 offers the administration a choice of whether to activate device management for the current client system or not. FIG. 17-B shows an interface enabling the administrator to select a network connection speed for the current client system, from a set of available options.

FIG. 18 shows an exemplary snapshot of the device management view, illustrating a manner in which GUI 65 may enable the administrator to associate the current client system with an owner and/or with a visual ID/icon. In some embodiments, GUI 65 allows the administrator to select the owner from a contacts list (e.g. Address Book).

FIG. 19 shows an exemplary snapshot of the device management view, illustrating a manner of displaying information about a protected client system. The available information may be grouped into sections, such as "Device", "Safety", and "Performance", among others. GUI 65 may visually represent the respective client system using device-specific icon 85 (here indicating a personal computer), device name 87, owner name 88, and visual ID 86 associated with the owner. The exemplary view of FIG. 19 may further show a location indicator 89 indicating whether the respective client system is currently connected to its home network (e.g. local network 14 protected by network regulator 18), or is out of the range of network 14. When the respective client system is not currently connected to its home network, some embodiments of location indicator 89 may further show whether the respective client system is currently protected using VPN.

FIG. 20-A-B show exemplary snapshots of the device management view generated by GUI 65, illustrating further information and/or configuration parameters and current values set for the current client system. In some embodiments, the device management view may display a group of vulnerability assessment indicators 91 determined for the current client system. Vulnerability data may be determined by a management agent executing on client system 12 and transmitted to client configuration server 52 (see, e.g., item 81 in FIG. 9). Vulnerability assessment indicators 91 may include a password quality indicator 92 and a list of system vulnerabilities, further illustrated in FIG. 20-B.

FIG. 21 shows an exemplary snapshot of the device management view of GUI 65, the view displaying a list of protected client systems. Each such client system may be represented using a device icon, device name, owner's name, and owner icon associated with the owner of the respective client system.

FIG. 22-A-B show exemplary snapshots of a notification view generated by GUI 65 according to some embodiments of the present invention. The illustrated notification view displays a list of event notifications. In some embodiments, event notifications are represented using a device icon, device name, owner's name, and owner icon associated to the respective client.

In some embodiments, more details about each event notification may be accessed by clicking (or touching) a GUI element such as an icon or the screen area containing the respective notification. A snapshot of a notification view displaying such details is shown in FIG. 23. Details displayed in relation to the selected notification may include an indicator of a type or category of event (e.g., "Website blocked"), and a time stamp. In some embodiments, a text definition 93 is provided to describe the respective type/category of event. Text definition 93 may be formulated to give the administrator an understanding of the respective event and of its urgency, importance, and potential consequences. Including such information in the notification may allow a person who is not particularly skilled in network management and computer security to use administration application 64 to remotely manage client systems 12*a-f* and/or network regulator 18.

FIG. 24-A-B show an exemplary notification view displayed in relation to device maintenance events (e.g., a software update notification and a disk cleanup notification, respectively). Some embodiments of the present invention display such maintenance notifications alongside security notifications (see, e.g. FIG. 22-A-B), allowing the administrator to manage security and device functionality from a single, unified interface.

In some embodiments, a device management view and a notification view generated by GUI 65 employ distinct manners of visually communicating information. For instance, each view may choose to emphasize a different visual element, such as an icon. Emphasizing a visual element herein means deliberately rendering the respective element in a manner that makes the respective element stand out in comparison with other visual elements on screen. Emphasizing a visual element may be achieved in many ways. For instance, to emphasize an icon, the icon may be scaled up to occupy a bigger area of the display than other visual elements. Emphasized elements may be rendered in brighter or more saturated colors than other elements. To emphasize a piece of text (e.g., a name), the respective text may be rendered in boldface or in a bigger font size, etc.

In some embodiments of a device management view, the device icon may be emphasized with respect to the owner icon. In contrast, in a notification view, the owner icon may be emphasized with respect to the device icon. An example of such selective, view-specific emphasizing is seen in FIGS. 19 and 23. Such a manner of presenting information may be more empathic and human-centric than others, and may appeal more to non-technical users.

The exemplary systems and methods described herein allow protecting a plurality of client systems against computer security threats, such as malicious software and network intrusion. Besides protecting conventional computer systems, the described systems and methods are particularly suited for protecting a diverse ecosystem of intelligent devices connected to the Internet, such as devices collectively known in popular culture as the Internet of Things (IoT). Examples of such devices include, among others, wearable devices (e.g., smartwatches, fitness bands, interactive jewelry), home entertainment devices (TVs, media players, game consoles), home appliances (refrigerators, thermostats, intelligent lighting systems, home security systems). Some embodiments allow, for instance, protecting all electronic devices in a home using a unified, integrated solution.

Some embodiments include a network regulator configured to set up and manage a local network interconnecting the plurality of protected client systems. The network regulator may install itself in a position of gateway between the local network and an extended network such as the Internet. In some embodiments, protection is achieved by the network regulator re-routing at least a part of data traffic exchanged between a protected client system and an entity outside the local network through a remote security server. The traffic may then be scanned for malware, and access to risky resources (e.g., malicious or fraudulent websites) blocked.

In some embodiments, the network regulator is uniquely associated with a service subscription, which allows a unified management of security and other aspects for all protected client systems, e.g., for all intelligent devices within a home. A security event, such as an attempt by a protected client system to access a fraudulent website, may thus be automatically associated with a subscription account, and reported to a contact person/administrator of the respective account. Reporting of security events may comprise sending a notification to an administration device (e.g., mobile phone) of the administrator. In some embodiments, such notifications are centralized by the security server and grouped per user and/or per device. A graphical user interface (GUI) executing on the administration device may display information about each security event, statistical data, etc. Some embodiments of the present invention therefore allow a centralized solution for managing computer security for a large number of customers/accounts, each such account associated with its own diverse group of devices.

Aside from ensuring protection of client systems connected to the local network, some embodiments provide a unified solution for automatic configuration, troubleshooting/technical assistance, and remote management of the protected client systems. Some embodiments install a utility agent on each protected device, the utility agent collaborating with remote servers to receive configuration data and/or executable code. The user/administrator of a client system may remotely manage the respective device via a user interface displayed on an administration device (e.g., mobile phone). Such management may include, for instance, setting operational parameters (a desired home temperature, a parental control setting, etc.), applying software updates, and troubleshooting.

Some embodiments of the present invention are specifically crafted for ease of use, so as to not necessitate specialized knowledge of computer engineering or network administration. For instance, upon installation, the network regulator may automatically take over some network services from an existing router, to become the default provider of Internet access for the local network.

It will be clear to a skilled artisan that the above embodiments may be altered in many ways without departing from the scope of the invention. Accordingly, the scope of the invention should be determined by the following claims and their legal equivalents.

What is claimed is:

1. A computing system comprising a hardware processor and a memory, the memory storing instructions which, when executed by the hardware processor, cause the computing system to:
   receive data from a remote server, the data selected by the server for transmission to the computing system according to a subscription associated with a network regulator protecting a plurality of client systems against computer security threats, wherein the plurality of client systems are connected to the network regulator over a local network; and
   perform a display of a graphical user interface (GUI) of a device administration application according to the data, the GUI configured to:
      generate at least one device management view enabling a user of the computing system to remotely configure a client system of the plurality of client systems by selecting a device group from a predetermined plurality of device groups to indicate a membership of the client system in the selected device group, wherein members of each device group have group-specific values of configuration parameters; and
      generate at least one security notification view displaying an indicator of a computer security event caused by an action of the client system,
   wherein the network regulator is configured, in response to connecting to a router providing a service of supplying local network addresses to the plurality of client systems, to automatically take over the service of supplying local network addresses from the router.

2. The computing system of claim 1, wherein the at least one device management view displays an interactive element enabling a user to select an entry from an address book of the computing system to designate an owner of the client system.

3. The computing system of claim 1, wherein the computer security event comprises detecting malicious software executing on the client system.

4. The computing system of claim 1, wherein the computer security event comprises detecting an attempt by the client system to access a resource located outside the local network, wherein accessing the resource constitutes a computer security threat to the client system.

5. The computing system of claim 1, wherein the indicator of the computer security event comprises an indicator of a category of computer security threats indicated by the computer security event, and further comprises a text definition of the category.

6. The computing system of claim 1, wherein the computing system comprises a mobile telephone.

7. A method comprising:
   employing a network regulator to protect a plurality of client systems against computer security threats, wherein the plurality of client systems are connected to the network regulator over a local network;
   employing the network regulator, in response to connecting to a router providing a service of supplying local network addresses to the plurality of client systems, to automatically take over the service of supplying local network addresses from the router;
   in response to the network regulator taking over the network service, employing a hardware processor of a computing system to receive data from a remote server, the data selected by the server for transmission to the computing system according to a subscription associated with the network regulator; and
   in response to the network regulator taking over the network service, employing the hardware processor to perform a display of a graphical user interface (GUI) of a device administration application according to the data, the GUI configured to:
      generate at least one device management view enabling a user of the computing system to remotely configure a client system of the plurality of client systems by selecting a device group from a predetermined plurality of device groups to indicate a membership of the client system in the selected device group, wherein members of each device group have group-specific values of configuration parameters; and
      generate at least one security notification view displaying an indicator of a computer security event caused by an action of the client system.

8. The method of claim 7, wherein the at least one device management view displays an interactive element enabling a user to select an entry from an address book of the computing system to designate an owner of the client system.

9. The method of claim 7, wherein the computer security event comprises detecting malicious software executing on the client system.

10. The method of claim 7, wherein the computer security event comprises detecting an attempt by the client system to access a resource located outside the local network, wherein accessing the resource constitutes a computer security threat to the client system.

11. The method of claim 7, wherein the indicator of the computer security event comprises an indicator of a category of computer security threats indicated by the computer security event, and further comprises a text definition of the category.

12. The method of claim 7, wherein the computing system comprises a mobile telephone.

13. A non-transitory computer-readable medium storing instructions which, when executed by a hardware processor of a computing system, cause the computing system to:
   receive data from a remote server, the data selected by the server for transmission to the computing system according to a subscription associated with a network regulator protecting a plurality of client systems against computer security threats, wherein the plurality of client systems are connected to the network regulator over a local network; and perform a display of a graphical user interface (GUI) of a device administration application according to the data, the GUI configured to:

generate at least one device management view enabling a user of the computing system to remotely configure a client system of the plurality of client systems by selecting a device group from a predetermined plurality of device groups to indicate a membership of the client system in the selected device group, wherein members of each device group have group-specific values of configuration parameters; and generate at least one security notification view displaying an indicator of a computer security event caused by an action of the client system, wherein the network regulator is configured, in response to connecting to a router providing a service of supplying local network addresses to the plurality of client systems, to automatically take over the service of supplying local network addresses from the router.

14. The computing system of claim 1, wherein the predetermined plurality of device groups comprises a family group and a guest group.

15. The computing system of claim 14, wherein the device administration application is further configured to:

in response to the user selecting the family group, allow the user to configure a set of device management parameters for the client system; and in response to the user selecting the guest group, not allow the user to configure the set of device management parameters.

16. The computing system of claim 15, wherein the set of device management parameters includes an owner name and an owner icon indicative of an owner of the client system.

17. The computing system of claim 1, wherein the at least one device management view is further configured to display a device icon representing the client system, an owner icon representing an owner of the client system, an indicator of the selected device group of the client system, and an indicator of a current security status of the client system.

18. The computing system of claim 17, wherein the at least one device management view is further configured to display an item selected from a group of items consisting of an indicator of a network connection speed of the client system, an indicator of an amount of storage space currently available on a storage device of the client system, and an indicator of a quality of a password set for the client system.

19. The computing system of claim 17, wherein the at least one security notification view is configured to display the device icon and the owner icon, and wherein:

the at least one device management view is configured to visually emphasize the device icon with respect to the owner icon; and the at least one security notification view is configured to visually emphasize the owner icon with respect to the device icon.

20. The computing system of claim 1, wherein the at least one device management view displays an interactive element enabling a user to select an image from a plurality of images stored on a storage device of the computing system, and wherein the GUI is further configured to display a rendition of the selected image to represent an owner of the client system.

21. The computing system of claim 1, wherein the at least one security notification view is configured to display an owner icon indicative of an owner of the client system, and wherein the device administration application is configured, in response to receiving an input indicating a user interaction with the owner icon, to invoke a telephone interface of the computing system.

22. The computing system of claim 1, wherein automatically taking over the service of supplying local network addresses to the plurality of client systems comprises the network regulator performing the steps of:

detecting an address availability probe transmitted by the client system over the local network, the address availability probe configured to enable the client system to determine whether a first network address is available, wherein the first network address is distinct from a current network address of the network regulator;

in response to detecting the address availability probe, transmitting a reply over the local network, the reply indicating that the first network address is currently in use; and transmitting a local network address offer to the client system.

* * * * *